United States Patent
Govil et al.

(10) Patent No.: US 9,582,725 B2
(45) Date of Patent: Feb. 28, 2017

(54) APPARATUS AND METHOD FOR LOW-POWER OBJECT-DETECTION IN IMAGES USING IMAGE INTEGRATION HARDWARE

(71) Applicant: QUALCOMM Incorporated, San Diego, CA (US)

(72) Inventors: Alok Govil, Fremont, CA (US); Evgeni Petrovich Gousev, Saratoga, CA (US); Venkat Rangan, San Diego, CA (US); Nelson Rasquinha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/985,158

(22) Filed: Dec. 30, 2015

(65) Prior Publication Data

US 2016/0117564 A1     Apr. 28, 2016

Related U.S. Application Data

(63) Continuation of application No. 14/866,739, filed on Sep. 25, 2015.

(Continued)

(51) Int. Cl.
    *G06K 9/00*            (2006.01)
    *G06K 9/32*            (2006.01)
    (Continued)

(52) U.S. Cl.
    CPC ..... *G06K 9/00973* (2013.01); *G06K 9/00288* (2013.01); *G06K 9/00624* (2013.01);
(Continued)

(58) Field of Classification Search
None
See application file for complete search history.

(56) References Cited

U.S. PATENT DOCUMENTS 5,289,023 A *   2/1994   Mead ................ H01L 27/14681
                                                         257/291
5,543,590 A      8/1996   Gillespie et al.
(Continued)

FOREIGN PATENT DOCUMENTS

CN         102663409 A       9/2012
DE    102006023611 A1    11/2007
(Continued)

OTHER PUBLICATIONS

Anonymous: "OpenCV—Haar Cascades vs. LBP Cascades in Face Detection—Stack Overflow", Stack Overflow, Jan. 9, 2012, Retrieved from the Internet Nov. 23, 2015: URL: http://stackoverflow.com/questions/8791178/haar-cascades-vs-lbp-cascades-in-face-detection, 2 pages.
(Continued)

*Primary Examiner* — Tahmina Ansari
(74) *Attorney, Agent, or Firm* — Kilpatrick Townsend & Stockton LLP

(57) ABSTRACT

An apparatus includes a hardware sensor array including a plurality of pixels arranged along at least a first dimension and a second dimension of the array, each of the pixels capable of generating a sensor reading. A hardware scanning window array includes a plurality of storage elements arranged along at least a first dimension and a second dimension of the hardware scanning window array, each of the storage elements capable of storing a pixel value based on one or more sensor readings. Peripheral circuitry for systematically transfers pixel values, based on sensor readings, into the hardware scanning window array, to cause different windows of pixel values to be stored in the hard-
(Continued)

ware scanning window array at different times. Control logic coupled to the hardware sensor array, the hardware scanning window array, and the peripheral circuitry, provides control signals to the peripheral circuitry to control the transfer of pixel values.

28 Claims, 18 Drawing Sheets

Related U.S. Application Data

(60) Provisional application No. 62/058,009, filed on Sep. 30, 2014, provisional application No. 62/058,010, filed on Sep. 30, 2014.

(51) Int. Cl.
| | |
|---|---|
| *G06K 9/60* | (2006.01) |
| *H04N 5/345* | (2011.01) |
| *H04N 5/347* | (2011.01) |
| *G06K 9/66* | (2006.01) |
| *H04N 13/02* | (2006.01) |
| *H04N 5/378* | (2011.01) |
| *H04N 5/232* | (2006.01) |
| *G06K 9/46* | (2006.01) |

(52) U.S. Cl.
CPC ............ *G06K 9/32* (2013.01); *G06K 9/3233* (2013.01); *G06K 9/605* (2013.01); *G06K 9/66* (2013.01); *H04N 5/347* (2013.01); *H04N 5/3454* (2013.01); *H04N 5/378* (2013.01); *H04N 13/0253* (2013.01); *G06K 9/00221* (2013.01); *G06K 2009/4666* (2013.01); *H04N 5/23219* (2013.01)

(56) References Cited

U.S. PATENT DOCUMENTS

| | | | |
|---|---|---|---|
| 6,011,257 A | 1/2000 | Endoh | |
| 6,459,509 B1* | 10/2002 | Maciey | H04N 1/12 358/406 |
| 7,038,185 B1 | 5/2006 | Tumblin et al. | |
| 7,151,844 B2 | 12/2006 | Stevenson et al. | |
| 8,203,440 B2* | 6/2012 | Schofield | H04N 7/183 340/425.5 |
| 8,462,996 B2 | 6/2013 | Moon et al. | |
| 8,902,971 B2 | 12/2014 | Pace et al. | |
| 8,928,793 B2 | 1/2015 | McMahon | |
| 9,332,239 B2 | 5/2016 | Cote et al. | |
| 2001/0028405 A1 | 10/2001 | Kondo et al. | |
| 2002/0012459 A1* | 1/2002 | Oh | G06K 9/32 382/154 |
| 2002/0100862 A1* | 8/2002 | Liu | H01L 27/14609 250/208.1 |
| 2004/0155175 A1 | 8/2004 | McNulty | |
| 2009/0020612 A1 | 1/2009 | Drzymala et al. | |
| 2009/0060383 A1 | 3/2009 | Li et al. | |
| 2009/0157707 A1 | 6/2009 | Ito et al. | |
| 2010/0182468 A1 | 7/2010 | Posch et al. | |
| 2010/0316254 A1 | 12/2010 | Kirsch et al. | |
| 2011/0128428 A1 | 6/2011 | Takatoku et al. | |
| 2011/0298755 A1 | 12/2011 | Ni | |
| 2012/0138774 A1 | 6/2012 | Kelly et al. | |
| 2012/0313960 A1 | 12/2012 | Segawa et al. | |
| 2013/0054505 A1 | 2/2013 | Ross et al. | |
| 2013/0121590 A1 | 5/2013 | Yamanaka et al. | |
| 2013/0176552 A1 | 7/2013 | Brown et al. | |
| 2013/0229508 A1 | 9/2013 | Li et al. | |
| 2014/0125799 A1 | 5/2014 | Bos et al. | |
| 2014/0149754 A1 | 5/2014 | Silva et al. | |
| 2014/0169663 A1 | 6/2014 | Han et al. | |
| 2014/0319325 A1 | 10/2014 | Kawahito et al. | |
| 2014/0320666 A1 | 10/2014 | Badawy et al. | |
| 2014/0363049 A1 | 12/2014 | Benosman et al. | |
| 2014/0368423 A1 | 12/2014 | Brenckle et al. | |
| 2014/0368626 A1* | 12/2014 | Archibald | H04N 5/23241 348/61 |
| 2014/0368712 A1 | 12/2014 | Park et al. | |
| 2015/0036942 A1 | 2/2015 | Smirnov et al. | |
| 2015/0311977 A1 | 10/2015 | Jovicic et al. | |
| 2015/0358525 A1 | 12/2015 | Lord | |
| 2016/0091946 A1 | 3/2016 | Govil | |
| 2016/0092735 A1 | 3/2016 | Govil | |
| 2016/0094800 A1 | 3/2016 | Gousev | |
| 2016/0094814 A1 | 3/2016 | Gousev | |
| 2016/0110603 A1 | 4/2016 | Govil et al. | |
| 2016/0241338 A1 | 8/2016 | Ganick et al. | |

FOREIGN PATENT DOCUMENTS

| | | |
|---|---|---|
| DE | 102008052930 A1 | 4/2010 |
| DE | 102008052930 A1 | 4/2010 |
| EP | 2665257 A1 | 11/2013 |
| EP | 2709066 A1 | 3/2014 |
| EP | 2757769 A1 | 7/2014 |
| JP | 2008131407 A | 6/2008 |
| JP | 2013003787 A | 1/2013 |
| WO | WO-2012093381 A1 | 7/2012 |
| WO | WO-2014015194 A2 | 1/2014 |
| WO | 2015148209 A1 | 10/2015 |

OTHER PUBLICATIONS

Butler, M., et al., "ROI processing offers opportunities—Vision Systems Design", May 1, 2006, Retrieved from the Internet: URL: http://www.vision-systems.com/articles/print/volume-11/issue-5/features/component-integration/roi-processing-offers-opportunities.html [retrieved on Dec. 2, 2015], 9 pages.

Cho, J., et al., "FPGA-Based Face Detection System Using Haar Classifiers", Field Programmable Gate Arrays, Feb. 22-24, 2009, 9 pages.

Choi, J., et al., "A 3.4[mu]W CMOS Image Sensor with Embedded Feature-extraction Algorithm for Motion-Triggered Object-of-interest Imaging," IEEE International Solid-State Circuits Conference, Feb. 17, 2013, pp. 478-479.

Fernandez-Berni, J., et al., "Bottom-up Performance Analysis of Focal-Plane Mixed-Signal Hardware for Viola-Jones Early Vision Tasks", International Journal of Circuit Theory and Applications, vol. 43, No. 8, Apr. 16, 2014, pp. 1063-1079.

Fernandez-Berni, J., et al., "Focal-Plane Sensing-Processing: A Power-Efficient Approach for the Implementation of Privacy-Aware Networked Visual Sensors," Sensors 2014, vol. 14, No. 8, Aug. 19, 2014, pp. 15203-15226.

Hartenstein, R. W., et al., "An Embedded Accelerator for Real World Computing", Proceedings of IFIP International Conference on Very Large Scale Integration, VLSI'97, Aug. 26-29, 1997, 12 pages.

Kriss, M: "Handbook of Digital Imaging", 2015, Wiley & Sons Ltd. Chichester, West Sussex, ISBN: 978-0-470-51059-9, vol. 1, 13 pages.

Lahdenoja, O., et al., "Extracting Local Binary Patterns with MIPA4k Vision Processor," IEEE 12th International Workshop on Cellular Nanoscale Networks and their Applications, Feb. 3, 2010, 5 pages.

Moloney, D., et al., "Myriad 2: Eye of the Computational Vision Storm", Hot Chips, Aug. 12, 2014, XP055230946, Retrieved from the Internet on Nov. 24, 2015: URL: http://www.hotchips.org/wp-content/uploads/hc_archives/hc26/HC26-12-day2-epub/HC26.12-6-HP-ASICs-epub/HC26.12.620-Myriad2-Eye-Moloney-Movidius-provided.pdf, 14 pages.

Muehlfellner, P., "Selection, Analysis and Implementation of Image-based Feature Extraction Approaches for a Heterogenous, Modular and Fpga-based Architecture for Camera-based Driver Assistance Systems Master Thesis Embedded and Intelligent Systems", Technical Report, Sep. 1, 2011, Retrieved from the Internet:

(56) References Cited

OTHER PUBLICATIONS

URL: https://www.diva-portal.org/smash/get/diva2:444576/FULLTEXT01.pdf [retrieved on Dec. 2, 2015], 97 pages.
"Myriad 2 Vision Processor Bringing Computational Imaging and Visual Awareness to Mobile, Wearable, and Embedded Markets Product Brief", Aug. 1, 2014, Retrieved from the Internet on Nov. 24, 2015: URL: http://uploads.movidius.com/1441734401-Myriad-2-product-brief.pdf, 2 pages.
Suarez, M., et al., "CMOS-3D Smart Imager Architectures for Feature Detection", IEEE Journal on Emerging and Selected Topics in Circuits and Systems, vol. 2, No. 4, Dec. 1, 2012, pp. 723-736.
Yang, M., et al., "Comparison of Spike Encoding Schemes in Asynchronous Vision Sensors: Modeling and Design", IEEE, International Symposium on Circuits and Systems, Jun. 1, 2014, pp. 2632-2635.
Delbruck, T., et al., "Activity-Driven, Event-Based Vision Sensors," Proceedings of 2010 IEEE International Symposium on Circuits and Systems (ISCAS), 2010, 4 pages.
Etienne-Cummings, R., et al., "A Programmable Focal-Plane MIMD Image Processor Chip", IEEE Journal of Solid-State Circuits, Jan. 2001, vol. 36, No. 1, pp. 64-73.
Hsiao, P.Y., et al., "A Novel CMOS Imager with 2-Dimensional Binarization and Edge Detection for Highly Integrated Imaging Systems," Digest of Technical Papers. International Conference on Consumer Electronics, 2006, pp. 71-72.
Lahdenoja, O., et al., "A Massively Parallel Algorithm for Local Binary Pattern based Face Recognition", IEEE, ISCAS 2006, pp. 3730-3733.
Laiho, M., et al., "Dedicated Hardware for Parallel Extraction of Local Binary Pattern Feature Vectors", 2005 9th International Workshop on Cellular Neural Networks and Their Applications, IEEE, May 2005, pp. 27-30.
Pierzchala, E., et al., "High Speed Field Programmable Analog Array Architecture Design", Analogix Corporation, Feb. 1994, 61 pages.
Poikonen, J., et al., "MIPA4k: A 64×64 Cell Mixed-mode Image Processor Array", ISCAS 2009, IEEE, May 24, 2009, pp. 1927-1930.
Posch, C., et al., "An Asynchronous Time-Based Image Sensor," IEEE International Symposium on Circuits and Systems (ISCAS), 2008, 4 pages.
Qualcomm, "FAST Corners", Sep. 15, 2015, 6 Slides (153289 IDF).
Shi, Y., et al., "Smart Cameras: Fundamentals and Classification," Chapter 2, A.N. Belbachir (Ed.), Springer Science+Business Media, LLC 2010, pp. 19-34.
Stack Overflow, "FAST Detector in every levels on Gaussian Pyramids", matlab, Retrieved from internet, URL:http://stackoverflow.com/questions/24222611/fast-detector-in-every-levels-on-gaussian-pyramids, on Sep. 11, 2015, 2 pages.
Wikipedia, "Features from accelerated segment test", Retrieved from Internet, URL: https://en.wikipedia.org/wiki/Features_from_accelerated_segment_test#High-speed_test, on Sep. 11, 2015, 6 pages.
Wyatt, J.L., et al., "The MIT Vision Chip Project: Analog VLSI Systems for Fast Image Acquisition and Early Vision Processing," IEEE International Conference on Robotics and Automation, 1991, vol. 2, pp. 1330-1335.
Yu, H, "FAST Corner detection—Machine Learning for high speed corner detection", Nov. 16, 2010, 60 Slides.
Huang D., et al., " Local Binary Patterns and Its Application to Facial Image Analysis: A Surve," IEEE Transactions on Systems, Man, and Cybernetics: Part C:Applications and Reviews, IEEE Service Center, Piscataway, NJ, US, vol. 41, No. 6, Nov. 1, 2011 (Nov. 1, 2011), pp. 765-781, XP011363204, ISSN: 1094-6977, DOI: 10.1109/TSMCC.2011.2118750 abstract sections I, III, V, VI.
Trein, J. et al., "Development of a FPGA Based Real-Time Blob Analysis Circuit", ISSC 2007, Derry, Sep. 13-14 (6 pages).

\* cited by examiner

APPARATUS AND METHOD FOR LOW-POWER OBJECT-DETECTION IN IMAGES USING IMAGE INTEGRATION HARDWARE

CROSS-REFERENCE TO RELATED APPLICATIONS

The present application is a continuation of and claims the benefit of U.S. patent application Ser. No. 14/866,739, filed Sep. 25, 2015, entitled "SCANNING WINDOW IN HARDWARE FOR LOW-POWER OBJECT-DETECTION IN IMAGES" which is incorporated herein by reference, and which claims the benefit of U.S. Provisional Application No. 62/058,009, filed Sep. 30, 2014, entitled "SCANNING WINDOW IN HARDWARE FOR LOW-POWER OBJECT-DETECTION IN IMAGES" which is incorporated herein by reference, and U.S. Provisional Application No. 62/058,010, filed Sep. 30, 2014, entitled "MULTI-BLOCK COMPUTER VISION FEATURE IMPLEMENTATION IN HARDWARE".

BACKGROUND

Aspects of the disclosure relate to computer vision.

Many existing computer vision algorithms are employed in face detection and other types of imaged based tasks (e.g., the Viola-Jones algorithm). However, many of these algorithms can be resource intensive in terms of processing power, memory usage, and data transfer bandwidth, by manipulating large amounts of image data in order to perform the desired computer vision algorithm in accordance with processor instructions.

Additionally, many existing computer vision algorithms make use of features for classification of objects within an image. Such computer vision algorithms may be used, for example, in face detection and other types of imaged based tasks. Examples of such feature-based algorithms include local binary patterns (LBP) and Haar-like features. However, feature-based algorithms often need to be performed many times (e.g., thousands of times) using different locations, sizes, scales, resolutions, rotations, and/or other parameters of data related to the image. The process can be take a long time and be quite resource intensive in terms of processing power, memory requirements, data transfer bandwidth, etc.

Thus, a need exists for computer vision computation techniques that are more resource efficient and that allow for efficient access to image data.

BRIEF SUMMARY

The present disclosure generally relates to enabling computer vision, and more specifically, improving efficiency for detecting features using computer vision.

In some implementations, an apparatus for isolating pixel values in hardware includes a hardware sensor array comprising a plurality of pixels arranged along at least a first dimension and a second dimension of the hardware sensor array, each of the pixels capable of generating a sensor reading based on environmental conditions. The apparatus also includes a hardware scanning window array comprising a plurality of storage elements arranged along at least a first dimension and a second dimension of the hardware scanning window array, each of the storage elements capable of storing a pixel value based on one or more sensor readings from the hardware sensor array. The apparatus further includes peripheral circuitry for systematically transferring pixel values, based on sensor readings from the hardware sensor array, into the hardware scanning window array, to cause different windows of pixel values to be stored in the hardware scanning window array at different times. The apparatus additionally includes control logic coupled to the hardware sensor array, the hardware scanning window array, and the peripheral circuitry, the control logic operable to provide control signals to the peripheral circuitry to control the transfer of pixel values into the hardware scanning window array.

In some implementations, the hardware sensor array includes configurable combining circuitry coupled to the plurality of pixels, the configurable combining circuitry operable to combine, in hardware, multiple sensor readings from the plurality of pixels to generate the pixel values, according to at least one combining pattern. The configurable combining circuitry includes a first plurality of controllable connections operable to connect adjacent pixels along the first dimension of the hardware sensor array, a second plurality of controllable connections operable to connect adjacent pixels along the second dimension of the hardware sensor array, wherein connecting adjacent pixels generates averaged pixel values at each of the adjacent pixels being conne.

In some implementations, the sensor reading is a sensor reading, wherein the sensor reading is an analog sensor reading, wherein the pixel value is an analog pixel value, and wherein the configurable combining circuitry is configurable analog combining circuitry.

In some implementations, the peripheral circuitry includes a line buffer comprising a plurality of storage elements arranged along at least a first dimension and a second dimension of the line buffer, the first dimension of the line buffer being smaller than the first dimension of the hardware sensor array, the second dimension of the line buffer being equal to the second dimension of the hardware sensor array. The line buffer is capable of storing selected rows of pixel values from the hardware sensor array.

In some implementations, the control logic is capable of storing a next row of pixel values from the hardware sensor array into the line buffer, by replacing an oldest row of pixel values in the line buffer, thereby introducing a discontinuity along a row direction in an image represented by the pixel values stored in the line buffer.

In some implementations, the peripheral circuitry further comprises a multiplexer circuit positioned between the line buffer and the hardware scanning window array, the multiplexer circuit capable of switching row ordering while transferring pixel values from the line buffer to the hardware scanning window array, thereby removing the discontinuity along a row direction in an image represented by the pixel values stored in the line buffer.

In some implementations, the peripheral circuitry further comprises a multiplexer circuit positioned between the hardware scanning window array and a hardware computer vision feature computation block, the multiplexer circuit capable of switching column ordering while transferring pixel values from the hardware scanning window array to the hardware computer vision feature computation block, thereby removing the discontinuity along a column direction in an image represented by the pixel values stored in the hardware scanning window array.

In some implementations, the control logic is capable of storing a next column of pixel values from the line buffer into the hardware scanning window array, by replacing an oldest column of pixel values in the hardware scanning window array, thereby introducing a discontinuity along a column direction in an image represented by the pixel values stored in the hardware scanning window array.

In some implementations, the peripheral circuitry further comprises a hardware computer vision feature computation block operable to perform, in hardware, computer vision computations based on values stored in the hardware scanning window array.

In some implementations, the apparatus further includes configurable combining circuitry coupled to the plurality of storage elements of the hardware scanning window, wherein the configurable combining circuitry is capable of performing combining, in hardware, of some multiple pixel values to generate a first set of combined pixel values according to a first combining pattern, while maintaining the multiple pixel values for subsequent combining of some other multiple pixel values to generate a second set of combined pixel values according to a second combining pattern, and wherein the first set of combined pixel values and the second set of combined pixel values are used by the hardware computer vision feature computation block to compute a multi-block local binary pattern computer vision feature.

In some implementations, the peripheral circuitry further comprises an integration block capable of computing an integral image based on the sensor readings from the hardware sensor array and storing the computed integral image in the scanning window array, and wherein combined pixel values generated from the integral image stored in the scanning window array are used by the hardware computer vision feature computation block to compute a multi-block local binary pattern computer vision feature.

In some implementations, the configurable combining circuitry comprises a first plurality of controllable connections operable to connect adjacent circuit elements along the first dimension of the hardware scanning window array, and a second plurality of controllable connections operable to connect adjacent pixels along the second dimension of the hardware scanning window array, wherein connecting adjacent pixels generates averaged pixel values at each of the adjacent pixels being connected.

In some implementations, the different ones of the first and second combining patterns allow for selection of the plurality of storage elements at different locations and dimensions within the hardware scanning window array.

In some implementations, the hardware computer vision feature computation block comprises circuitry operable to perform corner detection.

In some implementations, a second hardware scanning window array is coupled to the control logic, the control logic operable to provide control signals to control the transfer of pixel values from the hardware scanning window array to the second hardware scanning window array based on detection of a corner by the hardware computer vision feature computation block in an image represented by the pixel values stored in the hardware scanning window array, the peripheral circuitry further comprising a multiplexer circuit positioned between the hardware scanning window array and the second hardware scanning window array, the multiplexer circuit capable of switching column ordering while transferring the pixel values from the hardware scanning window array to the second hardware scanning window array, thereby removing a discontinuity along a column direction in the image.

In some implementations, a second hardware computer vision feature computation block operable to perform, in hardware, computer vision computations based on values stored in the second hardware scanning window array.

In some implementations, at least one pixel of the plurality of pixels comprises a sensor element and in-pixel circuitry.

In some implementations, the pixel values each based on the one or more sensor readings from the hardware sensor array comprise raw pixel values each based on one or more raw sensor readings.

In some implementations, no image signal processing circuitry is disposed between the hardware sensor array and the hardware scanning window array.

In some implementations, a method for isolating pixel values in hardware includes generating, via a plurality of pixels within a hardware sensor array, a sensor reading based on environmental conditions, wherein the plurality of pixels are arranged along at least a first dimension and a second dimension of the hardware sensor array. The method also includes storing, within a plurality of storage elements within a hardware scanning window array, a pixel value based on one or more sensor readings from the hardware sensor array, wherein the plurality of storage elements are arranged along at least a first dimension and a second dimension of the hardware scanning window array. The method further includes causing, via peripheral circuitry for systematically transferring pixel values, different windows of pixel values to be stored, based on sensor readings from the hardware sensor array, in the hardware scanning window array at different times. The method additionally includes providing, via control logic coupled to the hardware sensor array, the hardware scanning window array, and the peripheral circuitry, signals to the peripheral circuitry to control the transfer of pixel values into the hardware scanning window array.

In some implementations, an apparatus for isolating pixel values in hardware includes hardware means for generating a plurality of sensor readings based on environmental conditions. The apparatus also includes hardware means for storing, within a plurality of storage elements within the hardware means for storing, pixel values each based on one or more sensor readings from the hardware means for generating the sensor reading. The apparatus additionally includes hardware means for causing different windows of pixel values to be stored in the hardware means for storing pixel values at different times. The apparatus further includes hardware means for providing control signals to the hardware means for causing different windows of pixel values to be stored to control the transfer of pixel values into the hardware means for storing pixel values.

In some implementations, one or more non-transitory computer-readable media store computer-executable instructions for isolating pixel values in hardware that, when executed, cause one or more computing devices to cause, via peripheral circuitry for systematically transferring pixel values, different windows of pixel values to be stored, based on sensor readings from a hardware sensor array, in a hardware scanning window array at different times, and provide, via control logic coupled to the hardware sensor array, the hardware scanning window array, and the peripheral circuitry, signals to the peripheral circuitry to control the transfer of pixel values into the hardware scanning window array.

In some implementations, a low-power vision sensor includes an image sensor array capable of capturing an image, the image sensor array having a plurality of rows and a plurality of columns. The low-power vision sensor further includes one or more line buffers for transferring image data from one or more rows of the plurality of rows of the image sensor array. The low-power vision sensor also includes a hardware scanning window array for storing data based on a sample window of the image, the data to be used in a computer vision computation, the hardware scanning window array having a number of columns fewer than a number of columns of the one or more line buffers. The low-power vision sensor additionally includes computer vision feature computation hardware configured to compute a computer vision feature based on the data stored in the hardware scanning window array.

In some implementations, the low-power vision sensor also includes a frame buffer for data to be transferred to the hardware scanning window array.

In some implementations, the frame buffer is at least one of an image frame buffer or an integral image frame buffer.

In some implementations, the low-power vision sensor also includes integration hardware capable of computing an integral image based on the image data transferred by the one or more line buffers.

In some implementations, the integration hardware comprises two-dimension (2-D) integration hardware.

In some implementations, the integration hardware is coupled to the frame buffer.

In some implementations, the low-power vision sensor also includes an analog-to-digital converter (ADC) coupled to the one or more line buffers and the integration hardware.

In some implementations, the computer vision feature computation hardware is configured to compute a local binary patterns (LBP) feature.

In some implementations, the LBP feature is a multi-block LBP feature.

In some implementations, the low-power vision sensor further includes hardware cascade classifier configured to detect the presence of a reference object within the sample window stored in the hardware scanning window array based on computer vision features computed by the computer vision computation hardware.

In some implementations, no image signal processing circuitry is disposed between the image sensor array and the hardware scanning window array.

In some implementations, a for detecting an object in a low-power vision sensor includes capturing, via an image sensor array, an image, the image sensor array having a plurality of rows and a plurality of columns. The method also includes transferring, via one or more line buffers, image data from one or more rows of the plurality of rows of the image sensor array. The method further includes storing, via a hardware scanning window array, data based on a sample window of the image, the data to be used in a computer vision computation, the hardware scanning window array having a number of columns fewer than a number of columns of the one or more line buffers. The method additionally includes computing, via computer vision feature computation hardware, a computer vision feature based on the data stored in the hardware scanning window array.

In some implementations, one or more non-transitory computer-readable media storing computer-executable instructions for detecting an object in a low-power vision sensor that, when executed, cause one or more computing devices to capture, via an image sensor array, an image, the image sensor array having a plurality of rows and a plurality of columns, transfer, via one or more line buffers, image data from one or more rows of the plurality of rows of the image sensor array, store, via a hardware scanning window array, data based on a sample window of the image, the data to be used in a computer vision computation, the hardware scanning window array having a number of columns fewer than a number of columns of the one or more line buffers, and compute, via computer vision feature computation hardware, a computer vision feature based on the data stored in the hardware scanning window array.

In some implementations, an apparatus for detecting an object in a low-power vision sensor includes hardware means for capturing, via an image sensor array, an image, the image sensor array having a plurality of rows and a plurality of columns. The apparatus further includes hardware means for transferring, via one or more line buffers, image data from one or more rows of the plurality of rows of the image sensor array. The apparatus additionally includes hardware means for storing, via a hardware scanning window array, data based on a sample window of the image, the data to be used in a computer vision computation, the hardware scanning window array having a number of columns fewer than a number of columns of the one or more line buffers. The apparatus also includes hardware means for computing, via computer vision feature computation hardware, a computer vision feature based on the data stored in the hardware scanning window array.

In some implementations, a low-power vision sensor includes an image sensor array capable of capturing an image, the image sensor array having a plurality of rows and a plurality of columns. The low-power vision sensor also includes one or more line buffers for transferring image data from one or more rows of the plurality of rows of the image sensor array. The low-power vision sensor further includes integration hardware capable of computing an integral image based on the image data transferred by the one or more line buffers. The low-power vision sensor also includes computer vision feature computation hardware configured to compute a computer vision feature based on the integral image computed by the two-dimension integration hardware.

In some implementations, the low-power vision sensor also includes a hardware scanning window array for storing data based on a sample window of the image, the data to be used in a computer vision computation, the hardware scanning window array having a number of columns fewer than a number of columns of the one or more line buffers.

In some implementations, the low-power vision sensor also includes a frame buffer for data to be transferred to the hardware scanning window array.

In some implementations, the frame buffer comprises at least one of an image frame buffer or an integral image frame buffer.

In some implementations, the low-power vision sensor also includes an analog-to-digital converter (ADC) coupled to the one or more line buffers and the integration hardware.

In some implementations, the computer vision feature is a multi-block local binary pattern (LBP) feature.

In some implementations, the integration hardware comprises two-dimension (2-D) integration hardware.

In some implementations, the low-power vision sensor also includes a hardware cascade classifier configured to detect the presence of a reference object within the sample window stored in the hardware scanning window array based on computer vision features computed by the computer vision computation hardware.

In some implementations, method for detecting an object in a low-power vision sensor includes capturing, via an image sensor array, an image, the image sensor array having a plurality of rows and a plurality of columns. The method also includes transferring, via one or more line buffers, image data from one or more rows of the plurality of rows of the image sensor array. The method additionally includes computing, via integration hardware, an integral image based on the image data transferred by the one or more line buffers. The method further includes computing, via computer vision feature computation hardware, a computer vision feature based on the integral image computed by the two-dimension integration hardware.

In some implementations, an apparatus for detecting an object in a low-power vision sensor includes hardware means for capturing, via an image sensor array, an image, the image sensor array having a plurality of rows and a plurality of columns. The apparatus also includes hardware means for transferring, via one or more line buffers, image data from one or more rows of the plurality of rows of the image sensor array. The apparatus further includes hardware means for computing, via integration hardware, an integral image based on the image data transferred by the one or more line buffers. The apparatus also includes hardware means for computing, via computer vision feature computation hardware, a computer vision feature based on the integral image computed by the two-dimension integration hardware.

In some implementations, one or more non-transitory computer-readable media storing computer-executable instructions detecting an object in a low-power vision sensor that, when executed, cause one or more computing devices to capture, via an image sensor array, an image, the image sensor array having a plurality of rows and a plurality of columns, transfer, via one or more line buffers, image data from one or more rows of the plurality of rows of the image sensor array compute, via integration hardware, an integral image based on the image data transferred by the one or more line buffers, and compute, via computer vision feature computation hardware, a computer vision feature based on the integral image computed by the two-dimension integration hardware.

BRIEF DESCRIPTION OF THE DRAWINGS

Aspects of the disclosure are illustrated by way of example. In the accompanying figures, like reference numbers indicate similar elements.

DETAILED DESCRIPTION

Several illustrative implementations will now be described with respect to the accompanying drawings, which form a part hereof. While particular implementations, in which one or more aspects of the disclosure may be implemented, are described below, other implementations may be used and various modifications may be made without departing from the scope of the disclosure or the spirit of the appended claims.

Figure 1:
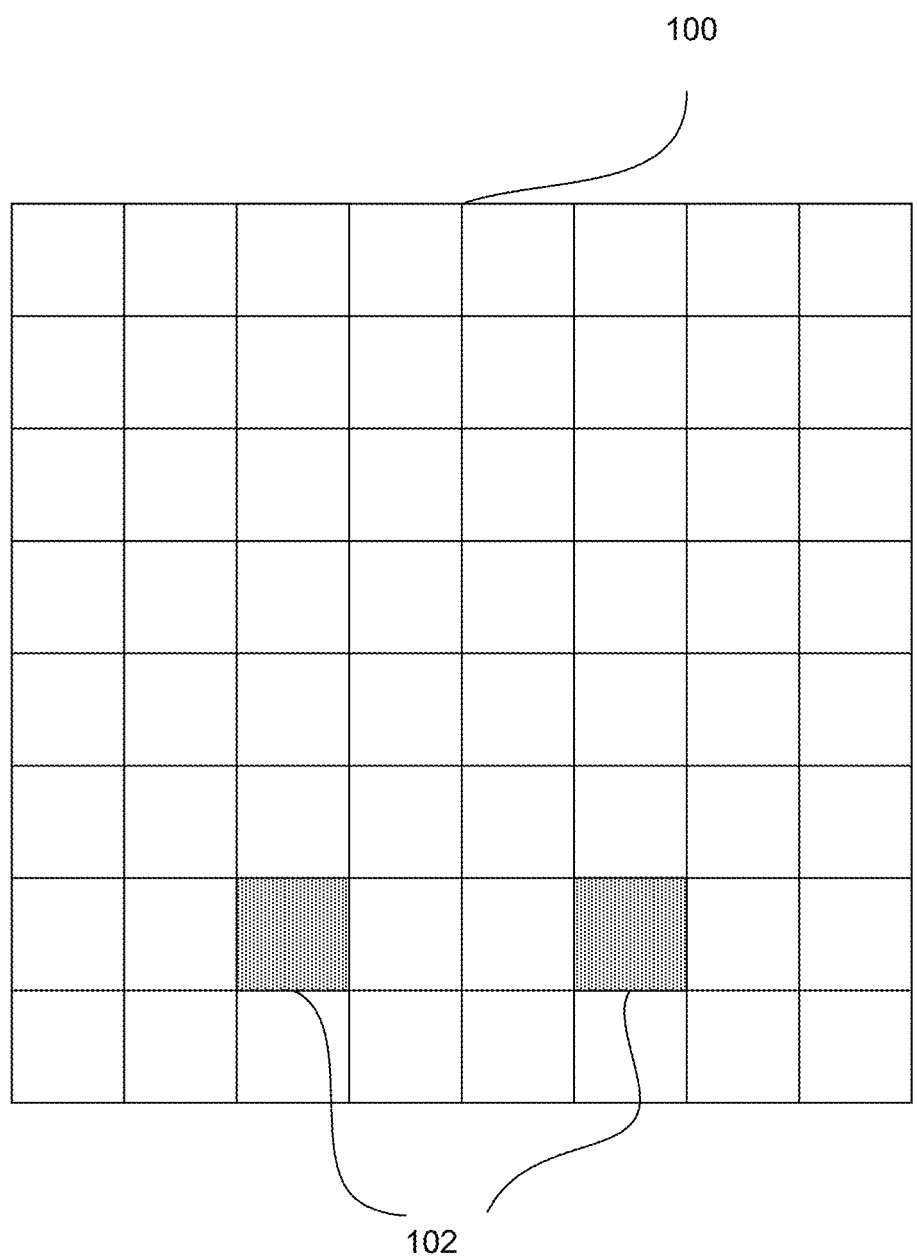
FIG. 1 illustrates an example sensor comprising a plurality of sensor elements arranged in a 2-dimensional array, according to some implementations.

A sensor may include a sensor element array of a plurality of sensor elements. The sensor element array may be a 2-dimensional array that includes sensor elements arranged in two dimensions, such as columns and rows, of the sensor element array. Each of the sensor elements may be capable of generating a sensor reading based on environmental conditions. In certain implementations, the sensor may be a vision sensor and may generate sensor readings based on light incident upon the sensor elements. FIG. 1 illustrates an example sensor 100 comprising a plurality of sensor elements arranged in a 2-dimensional array. In FIG. 1, the illustration of the sensor 100 represents 64 (8×8) sensor elements in the sensor element array. In various implementations, the shape of the sensor elements, the number of sensor elements and the spacing between the sensor elements may vastly vary, without departing from the scope of the invention. Sensor elements 102 represents example sensor elements from a grid of 64 sensor elements.

Figure 2:
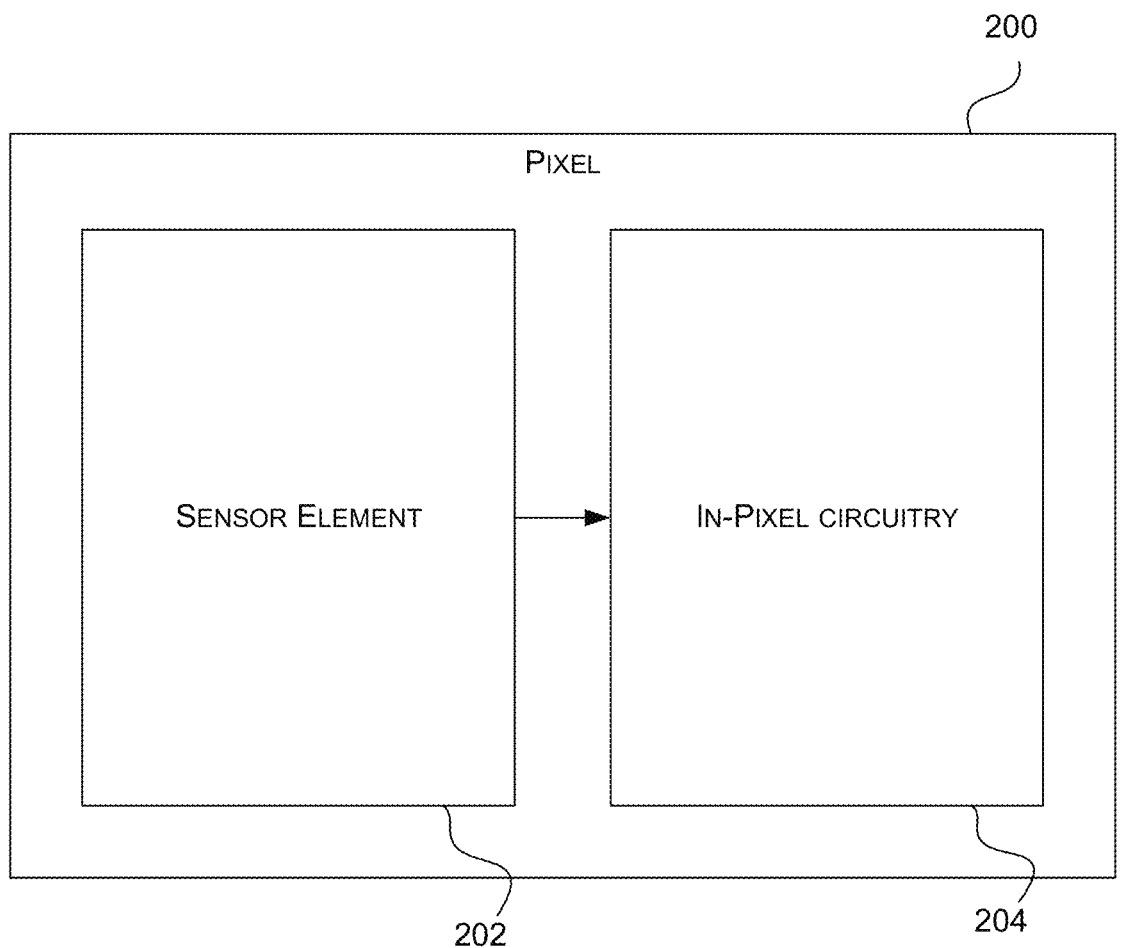
FIG. 2 illustrates an example pixel comprising a sensor element and in-pixel circuitry, according to some implementations.

In certain implementations, the sensor elements may have dedicated CV computation hardware implemented as in-pixel circuitry (computation structure) coupled to the sensor element. In some implementations, the sensor element and the in-pixel circuitry together may be referred to as a pixel. The processing performed by the in-pixel circuitry coupled to the sensor element may be referred to as in-pixel processing. In some instances, the sensor element array may be referred to as the pixel array, the difference being that the pixel array includes both the sensor elements and the in-pixel circuitry associated with each sensor element. However, for the purposes of the description herein, the terms sensor element and pixel may be used interchangeably. FIG. 2 illustrates an example pixel 200 with a sensor element 202 and in-pixel circuitry 204. In certain implementations, the in-pixel circuitry 204 may be circuitry, digital circuitry or any combination thereof.

Figure 3:
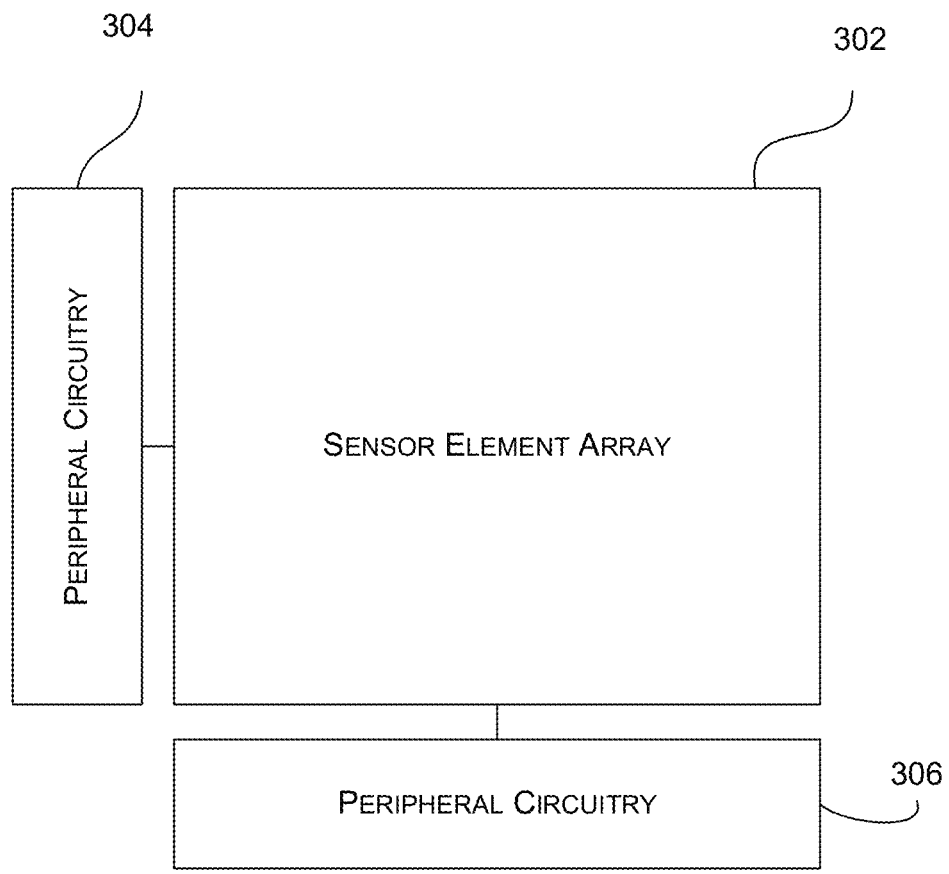
FIG. 3 illustrates an example sensor element array coupled to peripheral circuitry, according to some implementations.

In certain implementations, the sensor element array may have dedicated CV computation hardware implemented as peripheral circuitry (computation structure) coupled to a group of sensor elements. Such peripheral circuitry may be referred to as on-chip sensor circuitry. FIG. 3 illustrates an example peripheral circuitry (304 and 306) coupled to the sensor element array 302.

Figure 4:
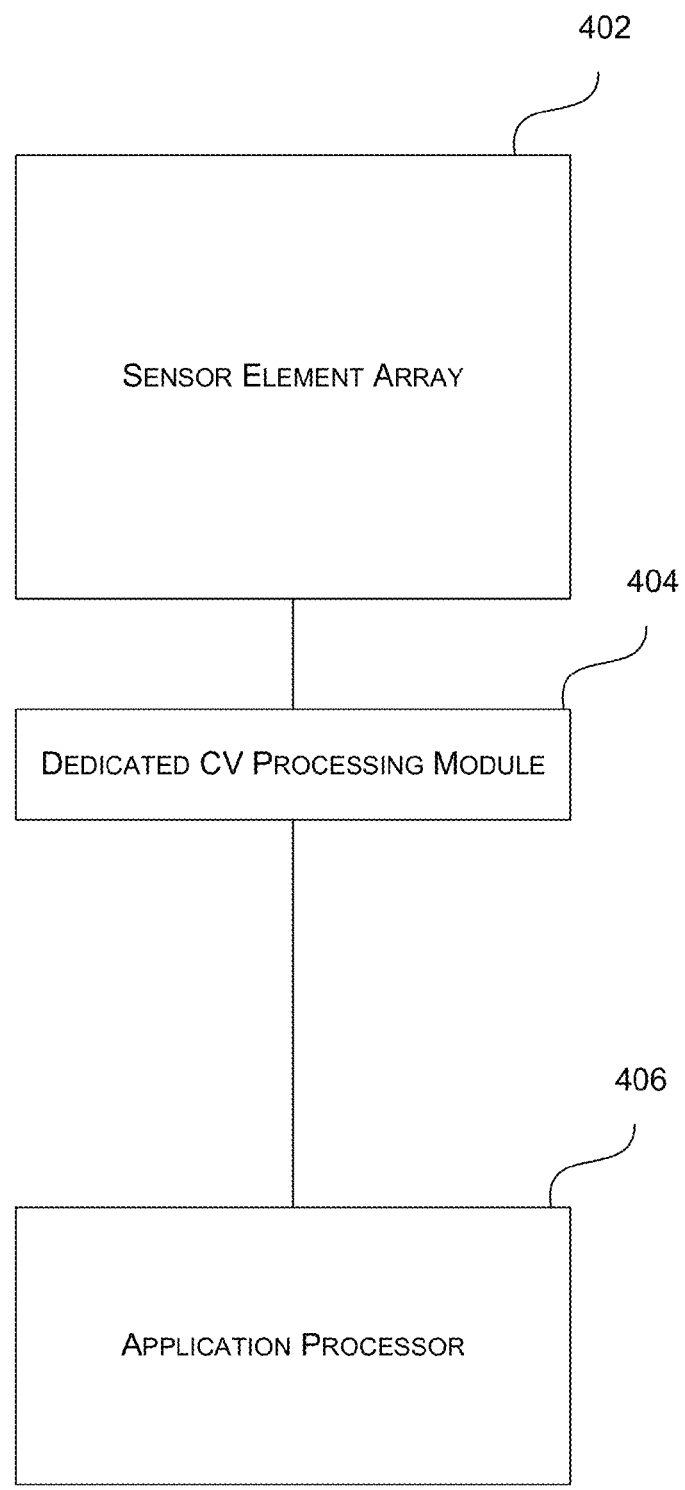
FIG. 4 illustrates an example sensor element array coupled to a dedicated CV processing module, according to some implementations.

Furthermore, as shown in FIG. 4, in certain implementations, the sensor element array may have dedicated CV computation hardware implemented as dedicated CV processing module 404 coupled to the sensor element array 402 and implemented using an Application Specific Integrated Circuit (ASIC), Field Programmable Gate Array (FPGA), embedded microprocessor, or any similar analog or digital computing logic for performing aspects of the disclosure.

It should be noted, that at least in certain implementations, the dedicated CV processing module 404 may be in addition to an Application Processor 406 and not instead of the Application Processor 406. For example, the dedicated CV processing module 404 may process and/or detect computer vision features. Whereas the Application Processor 406 may receive indications of these detected computer vision features and pattern match against previously stored images or reference indicators to determine macro-features, such as smiles, faces, objects, etc. In addition, the Application Processor 406 may be relatively vastly more complex, compute intensive, power intensive and responsible for executing system level operations, such as operating system, implement the user interface for interacting with the user, perform power management for the device, manage memory and other resources, etc. The Application Processor 406 may be similar to processor(s) 1310 of FIG. 13.

Scanning Window in Hardware

Figure 5A:
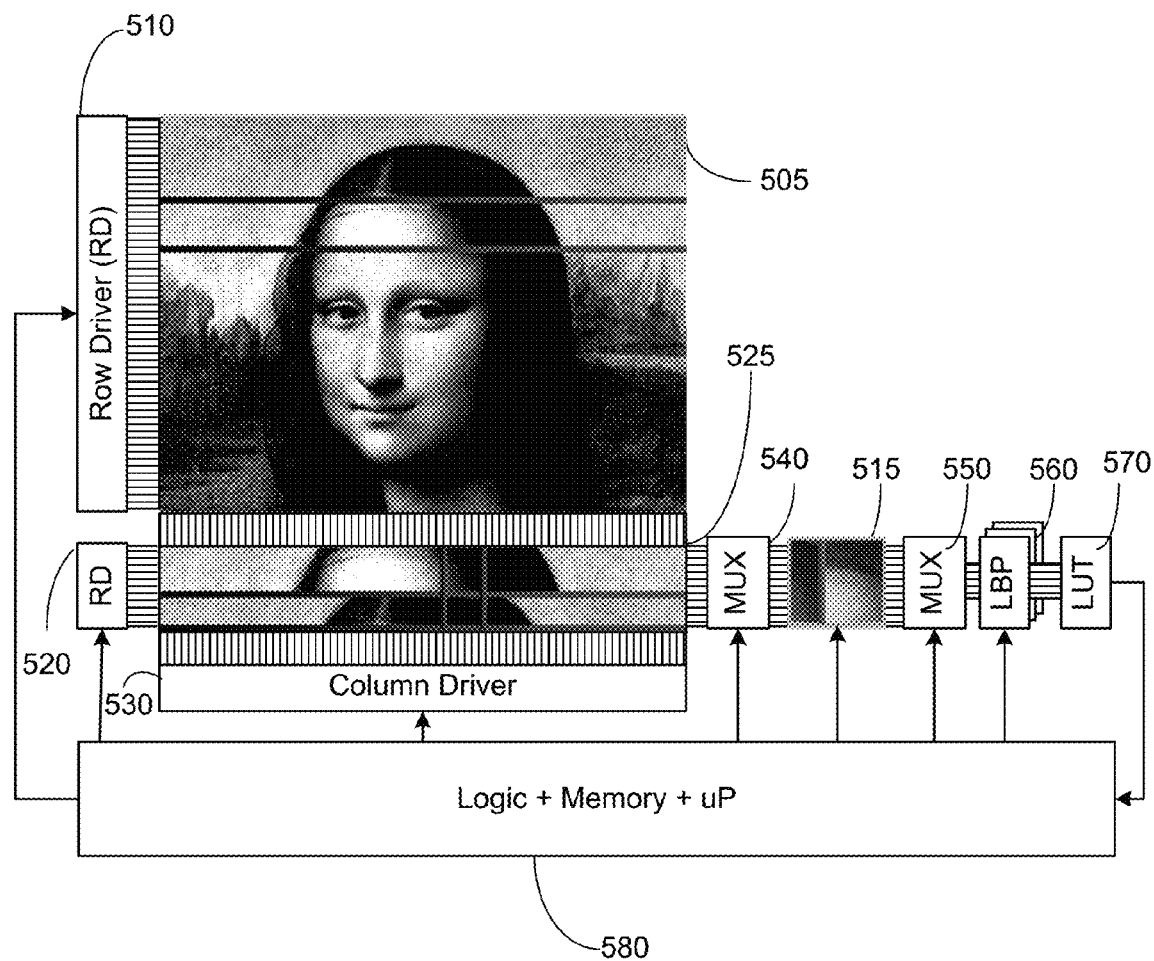
FIG. 5A also shows a pixel array and a scanning window array, according to some implementations.

FIG. 5A illustrates a high-level block diagram for implementing a scanning window in hardware. The high-level block diagram includes a first row driver 510, a second row driver 520, line buffers 525, a column driver 530, a first multiplexer (MUX) 540, and a scanning window array (SWA) 515. Optionally, the scanning window array 515 can be connected to a second multiplexer (MUX) 550, a computer vision feature computation block (LBP) 560, a look-up table (LUT) 570, and a logic, memory, and microprocessor block 580.

FIG. 5A also shows a pixel array 505 and a scanning window array (SWA) 515. The use of a scanning window, software-based algorithm is known in the art. However, as mentioned above, those solutions drain processor power as the processor often analyzes each point of the image. The implementation shown in FIG. 5A illustrates a hardware based scanning window function. In some implementations, the hardware scanning window array 515 is a dedicated hardware scanning window array in the sense that it is configured to store sample windows based on image data from the pixel array 505, as described throughout this specification, and has little to no other data storage function.

The pixel array 505 may include a plurality of photodiodes operable to detect light for capturing an image. The plurality of photodiodes is an example of hardware means for capturing an image. The captured image may have any size, and a representation of the image may be stored in the pixel array 505. The pixel array 505 may be the same as the original image (e.g., 128×128, 256×256, 912×912, 1,024× 1,024, or any arbitrary N×N or even N×M array, for example a 320×240 array). The pixel array 505 is an example of a hardware array that includes a plurality of sensor elements. The sensor elements can be arranged along a first dimension (e.g., rows) and a second dimension (e.g., columns). The pixel array 505 can generate a sensor reading based on environmental conditions (e.g., by using one or more photodiodes per sensor element to detect light at a given location in the array). The pixel array is an example of hardware means for generating a plurality of sensor readings based on environmental conditions. In some implementations, the pixel array may be part of a digital camera capable of recording an image of 320×240 pixels, also referred to as Quarter Video Graphics Array (QVGA) resolution.

In some optional implementations, the pixel array 505 can include configurable combining circuitry coupled to the sensor elements. The configurable combining circuitry can combine, in hardware, multiple sensor readings from the plurality of sensor elements to generate the pixel values, according to at least one combining pattern. The configurable combining circuitry is an example of hardware means for combining multiple sensor readings from the plurality of pixels to generate the pixel values. The combining pattern can include a first combining pattern along the rows of the pixel array 505 and a second combining pattern along the columns of the pixel array 505. In some implementations, a type of scaling can include averaging. Different combining patterns can include averaging pixel values over different dimensions of the sensor elements. For example, a block of 2×3, 3×2, 3×4, 4×3, or more generally, m×n, or any other dimension of pixel values can be averaged and/or weighted summed. It can be appreciated that while the term "pixel value" is used herein, the pixel value need not be a pixel value in the sense of a value of a pixel in the sensor array. For example, some sensor readings may be combined to generate a pixel value that is then stored in the scanning window array.

The configurable combining circuitry can include, but is not limited to, controllable connections operable to connect adjacent sensor elements along the first dimension (e.g., rows) of the pixel array 505 and controllable connections operable to connect adjacent sensor elements along the second dimension (e.g., columns) of the pixel array 505. The controllable connections is an example of hardware means for connecting adjacent pixels along the first dimension of the hardware sensor array and hardware means for connecting adjacent pixels along the second dimension of the hardware sensor array. In some implementations, the connecting adjacent sensor elements generate averaged pixel values at each of the adjacent sensor elements being connected. Examples of the controllable connections include, but are not limited to, transistors.

Optionally, pixels in the pixel array 505 may be averaged as described above prior to loading rows from the pixel array 505 into the line buffers 525. The averaging may be performed by shorting the active pixel sensors (APS) with each other, depending on the type of averaging desired. For example, assume any four pixels from the pixel array 505 arranged in a 2×2 fashion. That is, two pixels from a first row and 2 pixels in the same columns from a row immediately below the first row. All four of these pixels may be shorted together in hardware such that the pixel value for each of the four pixels is now the average of the pixel values of the four pixels (described in more detail with respect to FIG. 6).

The line buffers are an example of peripheral circuitry. They can include a plurality of storage elements arranged along a first dimension (e.g., rows) and a second dimension (e.g., columns) of the line buffer. In some implementations, the first dimension can be different from the first dimension of the pixel array 505 and the second dimension can be equal to the second dimension of the pixel array 505. In some implementations, for example the implementation of FIG. 5B, the line buffers 525 is a single line buffer that stores pixel values from a single row across all columns of the pixel array 505. For example, the line buffers 525 may be capable of storing selected rows of pixel values from the pixel array 505. The line buffers is an example of hardware means for storing, within a plurality of storage elements within the means for storing, pixel values each based on one or more sensor readings from the means for generating the sensor reading. Further, the line buffers is also an example of hardware means for causing different windows of pixel values to be stored in the hardware means for storing pixel values at different times. The peripheral circuitry is an example of hardware means for buffering comprising a plurality of storage elements arranged along at least a first dimension and a second dimension of the line buffer.

If a different scaling factor is desired, the process may be repeated again, described in further detail below.

Whether the pixel values are combined in hardware (e.g., averaged) prior to scanning or the pixel values are not combined, rows from the pixel array 505 may be copied into the line buffers 525. The logic, memory, and microprocessor block 580 may provide a row address to the first row driver 510 (e.g., only the line for that row will be active). The first row driver 510 may read the row from the pixel array 505, at the provided row address, while all the column lines remain active. Assuming this is the first row to be copied to the line buffers 525, the second row driver may then remain active on the first line to write the current row being read by the first row driver 510. This may continue for the next row in the pixel array 505 in a round-robin fashion. In the case where averaging has been performed on or in the pixel array 505, as described above, the first row driver 510 may scan every other row, every third row, every fourth row, etc. depending on the number of pixels involved in averaging. Ultimately, the line buffers 525 may be filled with rows from the pixel array 505. In some implementations, the scanning direction can be from one column to the next column or from one row to the next row. While illustrated in FIG. 5A as a plurality of line buffers 525, it is understood that line buffers 525 could include a single row in some implementations, for example, the implementation of FIG. 5B.

The logic, memory, and microprocessor block 580 may then provide a column address to the column driver in order to scan the desired columns from the line buffers 525. In some implementations, for example some implementations where averaging has been performed on the pixel array 505, as described above, the column driver may scan every other column, every third column, every fourth column, etc. depending on the number of pixels involved in averaging. As such, a specific scanning window from the line buffers 525 may be scanned (e.g., 32×32, 100×100, etc.), and by extension, a specific scanning window from combined or uncombined pixel values of the pixel array 505 may be scanned. The desired window may then be moved to the scanning window array 515 via controlled inputs to the first multiplexer 540, provided by the logic, memory, and microprocessor block 580. In digital implementations, analog to digital conversion via an analog-to-digital converter (not illustrated in FIG. 5A) may take place after line buffers 525 and before the values are stored in scanning window array 515, for example, an analog-to-digital converter may be disposed between line buffers 525 and multiplexer 540.

The scanning window array 515 is an example of another hardware array. It includes a plurality of storage elements along a first dimension (e.g., rows) and a second dimension (e.g., columns). Each of the storage elements within the scanning window array may be capable of storing an analog or digital pixel value based on one or more sensor readings from the pixel array 505. In some implementations, the scanning window array 515 may comprise a random-access memory (RAM) array or other two dimensional buffer capable of storing analog or digital pixel values. In some implementations, the number of storage elements within the scanning window array along the first dimension (for example, rows) is smaller than the number of sensor elements in the pixel array along a corresponding dimension (for example, rows) of the pixel array; similarly, the number of storage elements within the scanning window array along the second dimension (for example, columns) is smaller than the number of sensor elements in the pixel array along a corresponding dimension (for example, columns) of the pixel array. In some implementations, the number of columns within the scanning window array is smaller than the number of columns in the line buffers 525.

The effective copying of the pixel values from the pixel array 505 into the scanning window array 515 can be accomplished using peripheral circuitry. The peripheral circuitry can systematically transfer analog or digital pixel values, based on sensor readings from the pixel array, into the scanning window array, to cause different windows of pixel values to be stored in the scanning window array at different times. The peripheral circuitry can include the row driver, the column driver, the line buffers 525, and the multiplexer 540 or multiplexer circuit. In digital implementations, the peripheral circuitry can further include an analog-to-digital converter, for example, between line buffers 525 and multiplexer 540.

Additionally, control logic (e.g., logic, memory, and microprocessor block 580) can be coupled to the pixel array 505, scanning window array 515, and the peripheral circuitry. The control logic can provide control signals to the peripheral circuitry to control the transfer of pixel values into the scanning window array 515. The control logic is an example of hardware means for providing control signals to the means for causing different windows of pixel values to be stored to control the transfer of pixel values into the dedicated means for storing.

The control logic can also store a next row of pixel values from the pixel array 505 into the line buffers 525, by replacing an oldest row of pixel values in the line buffer. Such an implementation can be more efficient than shifting the entire set of rows down by one row and re-writing all rows accordingly. However, as shown in the image, such an implementation may result in tears in the image read from the pixel array 505. This is due to the round-robin or circular implementation of the line buffers 525. However, the horizontal tear can be dealt with by virtue of using the first multiplexer 540. The first multiplexer may remove the horizontal tear by restoring the line order via shifting the lines. This process is described in further detail below. The peripheral circuitry additionally includes a switch circuit (e.g., multiplexer) positioned between the line buffers 525 and the scanning window array 515. The switch circuit can switch row ordering while transferring pixel values from the line buffer to the SWA 515. Hardware means for storing a next column of pixel values from the line buffer into the hardware scanning window array can include switch circuit (for example, multiplexer) to remove a horizontal tear in the image. This may result in removal of the tear (or discontinuity) along the row direction in the image represented by pixels in the SWA 515. It can be appreciated that scanning now vertically across the line buffers 525 and transferring windows of the portion of the image stored in line buffers 525 may also result in vertical tears in the image read from the line buffers 525 for similar reasons described above. To address such vertical tears, a similar switch circuit may be used that can switch column ordering while transferring pixel values from the SWA to hardware computer vision feature computation block 560. The tears in the image may be addressed pursuant to methods described further below. In implementations where the scanning window array 515 includes addressable memory, tears may also be dealt with using data pointers.

The process may then repeat for the next desired window to be scanned in the pixel array 505. In essence, the implementation shown in FIG. 5A allows for a multi-position, multi-size (e.g., capable of being various different dimensions) scanning window array 515 built into peripheral circuitry.

Once the SWA 515 is filled with some pixel values, one or more pixels in the SWA 515 can be combined (for example, averaged, as discussed herein for pixel values in the pixel array) and fed into one or more analog or digital hardware computer vision feature computation blocks 560. One such example of a hardware computer vision feature computation block 560 is a local binary pattern (LBP) computation block, including LBP variants such as local tertiary patterns (LTP), described elsewhere herein. Other hardware computer vision feature computation blocks include histogram of signed or oriented gradients (HSG, HOG), Features from accelerated segment test (FAST) corners, and their variants, among many others. Digital implementations of such computations blocks are known in the art. An implementation of a circuit capable of performing LBP computations is disclosed herein. Also, in the discussion above, it is understood that for a multicolor image, a pixel may not have a single value, but may have multiple values, for example three values in the case of an (red-green-blue) RGB image. Hence, in the example of an RGB image, the scanning window array 515 described above may actually be a scanning window comprising three sub-arrays: a red SWA, a green SWA, and a blue SWA (not illustrated as separate sub-arrays). In such implementations, the computer vision feature computation blocks 560 shown in FIG. 5A may be shared by the different color channel SWAs, or different colors may have dedicated computer vision feature computation blocks 560. Similarly, the line buffers 525 and other components shown in FIG. 5A may be shared for different color channels, or each color channel may have dedicated circuitry. The illustrated implementations have assumed that the number of columns in the line buffers 525 and the number of columns in the sensor array are equal. However, in some implemenations, the sensor array may be a relatively high resolution sensor array, and sensor value averaging may be performed prior to reading rows of the data out to line buffers 525. In such implementations, the number of columns in the line buffers 525 may be fewer than the number of columns in the sensor array.

Figure 5B:
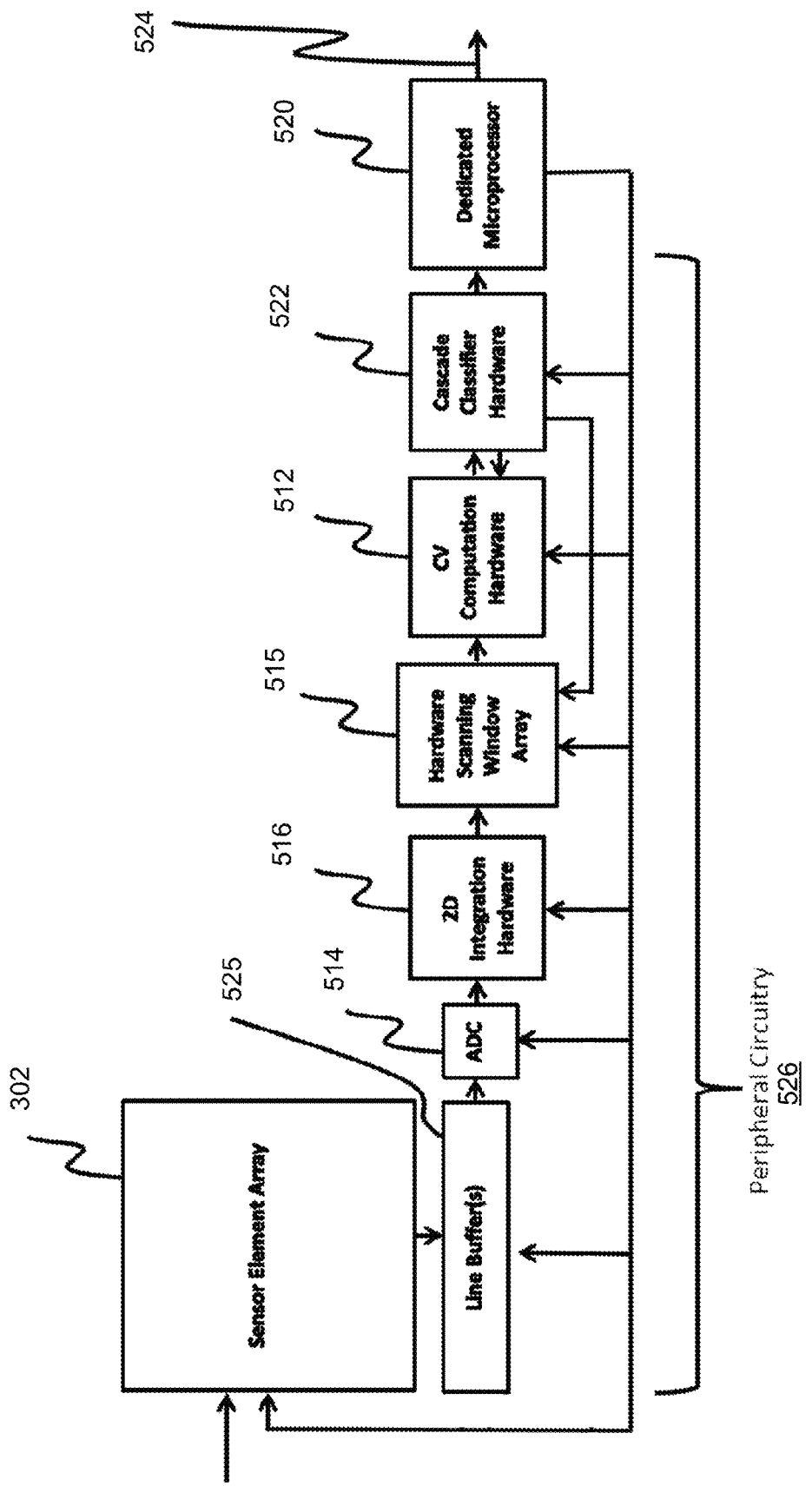
FIG. 5B illustrates an example implementation smart vision sensor including a sensor element array, CV computation hardware, and dedicated microprocessor

FIG. 5B illustrates an example implementation smart vision sensor including a sensor element array, CV computation hardware, and dedicated microprocessor. The sensor element array 302 may be similar to sensor 100 illustrated in FIG. 1. In some implementations, the sensor element array 302 is an image sensor array. The sensor element array 302 may include a correlated double sampling circuit. The sensor element array 302 may also include circuitry to combine, sum or average sensor element or pixel signals or values before outputting the signals to line buffer(s) 525, for example in implementations where CV computation is improved using combined values or a lower resolution. Line buffer(s) 525 may include one or more line buffers to transfer signals representing the image or portions of the image out of the sensor element array 302 to other portions of the vision sensor. In some implementations, the number of rows in the one or more line buffers 525 is fewer than the number of rows in the sensor element array 302. In some implementations, the sensor element array 302 may not include circuitry for image signal processing (ISP), and hence, FIG. 5B illustrates an implementation where the sensor element array 302 and CV computation hardware 512 are connected without intervening ISP circuitry, hence, in some implementations, no ISP circuitry is disposed between the hardware sensor array 302 and the hardware scanning window array 515. Thus, the sensor element array 302 and the CV computation hardware 512 with no ISP circuitry disposed therebetween may be an example of no means for image signal processing disposed between the hardware means for generating sensor readings and the hardware means for storing pixel values. For example, in some implementations, the signals received by the CV computation hardware 512 from the sensor element array 302 have not undergone ISP, for example, the signals have not undergone one or more of defect correction, white balancing, color balancing, auto focus, lens roll off, demosaicing, debayering, or image sharpening, or any combination thereof. However, in some such no-ISP implementations, some processing may occur, such as focusing or auto-exposure correction. Such signals that have not undergone ISP may be referred to as raw signals or raw sensor readings. Raw signals or raw sensor readings can be combined, as discussed elsewhere herein with respect to sensor readings generally, to generate raw pixel values based on the raw signals where signals used to generate raw pixel values have not undergone ISP. Raw signals, raw sensor readings, or raw pixel values can be converted to digital, integrated to form an integral image, stored in a scanning window and dedicated CV computation hardware can be configured to receive the raw signals, raw sensor readings, or raw pixel values, even though it is understood that the raw signals, raw sensor readings, or raw pixel values have undergone some data manipulation (including, combination, summation or integration, or conversion to digital), but have not undergone ISP. Raw pixel values can include analog or digital raw pixel values. In one implementation, the sensory element array 302 is a Quarter Video Graphics Array (QVGA) camera sensor without ISP circuitry with the array comprising 320 by 240 sensor elements.

In various implementations, the CV computation hardware 512 can perform CV computations in either the digital or analog domain. Some examples of CV computation circuits capable of performing CV computations in the analog domain are disclosed herein with reference to FIGS. 6-8 and 10A-10B. Digital versions of those and similar circuits are also possible. Therefore, optionally, in digital implementations, an analog-to-digital converter (ADC) 514 may be disposed between the line buffer(s) 525 and the CV computation hardware 512. In some implementations, the CV computation hardware 512 is dedicated CV computation hardware in the sense that it is hardware designed to have little or no functionality other than to compute CV features.

In some implementations, the CV computation hardware 512 may use combinations, sums, or averages of signals associated with blocks of sensor elements or pixels as discussed with reference to FIG. 1. In such implementations, an integral image can be useful in computing such combinations, sums, or averages prior to input into the CV computation hardware 512. Therefore, optionally, the vision sensor may also include two dimensional integration hardware 516 for computing an integral image of at least a part of the image based on at least a subset of the signals representative of the image sampled by at least a subset of sensor elements in the sensor element array. However, as disclosed elsewhere herein, such combinations, sums, or averages, when useful, may be performed with circuitry within the hardware scanning window array 515, and integration hardware is therefore optional. As illustrated, the two dimensional integration computation hardware 516 can be in communication with the dedicated CV computation hardware. The integral image representative of the image sampled by the sensor element array and/or the integral image of a portion of the image sampled by the sensor element array can be used to more quickly combine, sum, or average signal values for blocks of sensor elements compared to adding the signal values directly. Two dimensional integration hardware 516 can include circuitry capable of generating signals representative of the integral image of all or a portion of the image sampled by sensor element array in either the digital or analog domains based on raw signals from the sensor element array. In some implementations, the integral image (which may be an integral image of only a portion or sample window of the image sampled by the sensor element array) generated by the two dimensional integration hardware 516 can be stored in a hardware scanning window array 515. Hence the hardware scanning window array 515 can, in different implementations, store data based on a sample window of the image, where the stored data can comprise data representative of the sample window of the image or the integral image. For example, the hardware scanning window array may include a random-access memory (RAM) array or other form of analog or digital memory for storing the integral image. In implementations where computing combinations, sums, or averages of signals corresponding to blocks of sensor elements is not useful, such as pixel-level LBP, it is understood that the two dimensional integration hardware 516 may not be included, and hence a sample window including analog signals from the sensor element array 302 or converted-to-digital signals from the ADC 514 may be stored directly in the hardware scanning window array 515. In some implementations, a frame buffer (not shown) may be connected between the two dimensional integration hardware 516 and the hardware scanning window array 515. The frame buffer may be operable for storage of integral image outputted by the two dimensional integration hardware 516 and sample windows of the integral image may then be loaded into the hardware scanning window array 515 as needed. Alternatively, the frame buffer may be disposed between the line buffer(s) 525 and the two dimensional integration hardware 516 and may store the image. In such an implementation, the two dimensional integration hardware 516 can generate integral images of sample windows of the image stored in the frame buffer for storage in the hardware scanning window array 515. Hence, in various implementations, the frame buffer can be at least one of an image frame buffer or an integral image frame buffer. Furthermore, it is understood that in some implementations, two dimensional integration hardware 516 may also or instead perform one dimensional integration.

Similarly, the hardware scanning window array 515 may store a one dimensional integral image corresponding to a sample window of the image captured by the sensor array. A one dimensional integral image can allow quick summation of groups of pixel values in a row of image data. Use of one dimensional integral images can allow for the computation of multi-block LBP, for example, using rotated blocks in order to detect rotated reference objects, for example, faces. The frame buffer is an example of hardware means for transferring data to the hardware scanning window array. The one or two dimensional integration hardware is an example of hardware means for computing an integral image based on the image data transferred by the one or more line buffers.

The vision sensor may also include CV computation hardware 512. In some implementations, the CV computation hardware 512 can compute a localized CV feature for a block of one or more subject sensor elements based on, at least in part, signals associated with a plurality of neighboring sensor elements in proximity to the block of sensor elements. For example, in a local binary pattern (LBP) implementation of CV computation hardware, CV computation hardware can include hardware that receives signal values corresponding to image signals—or combinations, sums, or averages of image signals (generated, for example, using an integral image)—and generates a digital LBP label based on the raw image signals. In implementations where multi-block LBP is computed, the block of one or more subject sensor elements can include, as one example, a block of 11 by 11 sensor elements. It is also understood that a pixel-level LBP computation may also be made where the block of one or more subject sensor elements for which the localized CV feature is computed is a single subject sensor element. Although the description above referenced CV computation hardware 512 as separate from the dedicated microprocessor 520, it is understood that in some implementations, dedicated CV computation hardware 512 may be implemented in hardware within the dedicated microprocessor 520. The CV computation hardware 512 is an example of hardware means for computing a local binary patterns (LBP) feature.

Generating the CV features, such as the LBP labels discussed above, in dedicated hardware can reduce the power of the vision sensor compared to computing the CV features in a processor, for example a general purpose processor such as an application processor or even a dedicated microprocessor. However, the vision sensor may still include a dedicated microprocessor 520 coupled to the CV computation hardware 512. The dedicated microprocessor 520 receives the hardware-computed CV features from the CV computation hardware 512 and can perform higher-level computer vision operations such as object-class detection (of which face detection can be regarded as a specific case), in which the task is to find the locations and sizes of all objects in an image that belong to a given class, as well as other computer vision operations. Furthermore, the dedicated microprocessor 520 can provide control signals to the line buffer(s) 525, ADC 514, two dimensional integration hardware 516, hardware scanning window array 515, and CV computation hardware 512. In some implementations, to perform the object-class detection or other computer vision operations, the dedicated microprocessor 520 may use a cascade classifier algorithm to perform object-class detection, for example face detection. In an optional implementation, further power savings are possible by implementing the cascade classifier in hardware, to further reduce the computational burden on the microprocessor.

The optional cascade classifier hardware 522 includes a hardware implementation of a cascade classifier. The cascade classifier 522 can be configured to detect the presence of a reference object within the sample window stored in the scanning window array based on CV features computed by the CV computation hardware 512. In some implementations, the cascade classifier is trained using machine learning techniques on a data set of images including examples of the reference object the cascade classifier will be trained for and examples of non-objects, for example images of faces and non-faces. For example, in a first stage, the cascade classifier hardware may request from the CV computation hardware 512 that LBP features be computed for a certain number, l, of subject sensor elements stored in, for example, the hardware scanning window array 515. In addition, the location of the subject sensor elements, $\{(x_{11}, y_{11}), \ldots (x_{1l}, y_{1l})\}$, will also be provided by the cascade classifier hardware 522. Once the CV computation hardware 512 provides the requested LBP features, which can be treated as vector values, the cascade classifier hardware performs a summation of a dot product of each of the LBP features with one or more weights to generate a first weighted scalar sum value. In general, each LBP feature, $(LBP_{11}, \ldots, LBP_{1l})$ will be multiplied by a given weight, $(w_{11}, \ldots, w_{1l})$, each of which can be different. The first weighted scalar sum value is then compared to a first threshold. If the scalar sum is less than the threshold, then to a given probability, there is no face in the portion of the image represented by the signals stored in the hardware scanning window array 515, and hence the cascade classifier hardware 522 sends a signal to the hardware scanning window array 515, and optionally to other components of the vision sensor, such as the line buffer(s) 525 and the sensor element array 302, to indicate that the hardware scanning window array 515 should continue scanning and add one or more new columns or rows and remove one or more old columns or rows. With a subsequent window of the image, or a subsequent plurality of signals corresponding to a subsequent subset of sensor elements of the sensor element array, stored in the hardware scanning window array 515, the process can begin anew. It is understood that the subsequent window of the image may overlap in large part with the previous window of the image. In some implementations, the image is scanned from left to right, and once the end of the sensor element array 302 is reached, the image may be scanned again from left to right after moving down one or more rows. In another implementation, the image may be scanned from right to left after shifting down by one or more rows, which may allow for an increased overlap with the prior image. The cascade classifier hardware 522 is an example of hardware means for a detecting reference object within the sample window stored in the hardware scanning window array based on computer vision features computed by the computer vision computation hardware.

If the scalar sum is greater than the first threshold, then the cascade classifier hardware 522 moves to the next stage. In the next (in this example, second) stage, the cascade classifier hardware again requests the CV computation hardware 512 to provide LBP features for m subject sensor elements at locations $\{(x_{21}, y_{21}), \ldots (x_{2m}, y_{2m})\}$ stored in the hardware scanning window array 515. Once the CV computation hardware 512 computes and provides the requested LBP features, $(LBP_{21}, \ldots, LBP_{2m})$, the cascade classifier hardware 522 performs another summation of a dot product of each of the LBP features with one or more weights, $(w_{21}, \ldots, w_{2m})$, to generate a second weighted scalar sum value. The second weighted scalar sum value is then compared to a second threshold. If the scalar sum is less than the second threshold, there is a low likelihood of a face being present in the portion of the image represented by the signals stored in the hardware scanning window array 515, and the cascade classifier sends a signal to the other components in the vision sensor array to continue scanning and move to a next portion of the image. If the second weighted scalar sum value is greater than the second threshold, the process continues to a third stage as described above. At the end of a final stage, for example an Nth stage in a N-stage cascade classifier, if the Nth weighted scalar sum value is greater than the Nth threshold, then a face is detected in the portion of the image stored in the hardware scanning window array 515. The cascade classifier hardware 522 can then indicate to the dedicated microprocessor 520 that a face has been detected, and may further optionally indicate the location of the portion of the image in which the face or portion of a face was detected.

The numbers and locations of subject sensor elements within the hardware scanning window array 515 for which LBP is to be computed at each stage is generally programmed into the cascade classifier hardware 522 and result from the machine learning training discussed above. Similarly, the weights to multiply to each of the LBP features are also generally determined during machine learning training and then programmed into the cascade classifier hardware 522. The number of stages also results from the training, and is programmed into the cascade classifier hardware 522. In some implementations, a cascade classifier can include between 1 and 31 stages, for example, 15 stages. Cascade classifier hardware 522 can, in some implementations, be considered dedicated cascade classifier hardware in the sense that it is hardware designed to perform the cascade classifier function and little to no other significant functions. While the implementation described above relates to a cascade classifier based on programmed weights and thresholds based on previous, in the laboratory, training and machine learning to generate a model, it is understood that cascade classifier hardware 522, or other hardware in peripheral circuitry designed to perform CV operations based on hardware-computed CV features received from CV computation hardware 512, can be designed to perform machine learning in the field.

In the implementation just described, the dedicated microprocessor 520 can then determine what to do with the, for example, face detected event. For example, it may send an event to a second microprocessor. In some implementations, the dedicated microprocessor 520 and the second microprocessor may correspond to dedicated microprocessor 404 and the application processor 406 of FIG. 4, respectively. As illustrated in FIG. 5B, the dedicated microprocessor 520 includes an interface 524 for communications with the second microprocessor.

Although the description above referenced cascade classifier hardware 522 as separate from the dedicated microprocessor 520, it is understood that in some implementations, the dedicated cascade classifier hardware 522 may be implemented in hardware within the dedicated microprocessor 520. Alternatively, a cascade classifier may be run as a software algorithm on the dedicated microprocessor 520. Furthermore, other software algorithms may be run on the dedicated microprocessor in the place of, or in addition to, the cascade classifier. In some implementations, dedicated hardware may be implemented to detect, for example, a face using histograms. Such an implementation may include such dedicated hardware in the place of, or in addition to, cascade classifier hardware 522. In some such implementations, a histogram of all LBP labels computed for a sample window of the image stored in the scanning window array 515 can be compared to a reference histogram to detect the presence of a face in the sample window stored in the scanning window array 515. Uses of histograms with LBP labels or features are discussed below with reference to FIG. 9.

In the implementation illustrated in FIG. 5B, one or more of the line buffer(s) 525, the ADC 514, the two dimensional integration hardware 516, the hardware scanning window array 515, the CV computation hardware 512, the cascade classifier hardware 522, or any combination thereof, may be considered peripheral circuitry 526, that is circuitry that is peripheral to the sensor element array 302. It is also understood that the various components just listed, or any combination thereof, may be implemented instead as in-pixel circuitry within the sensor element array 302.

Figure 5C:
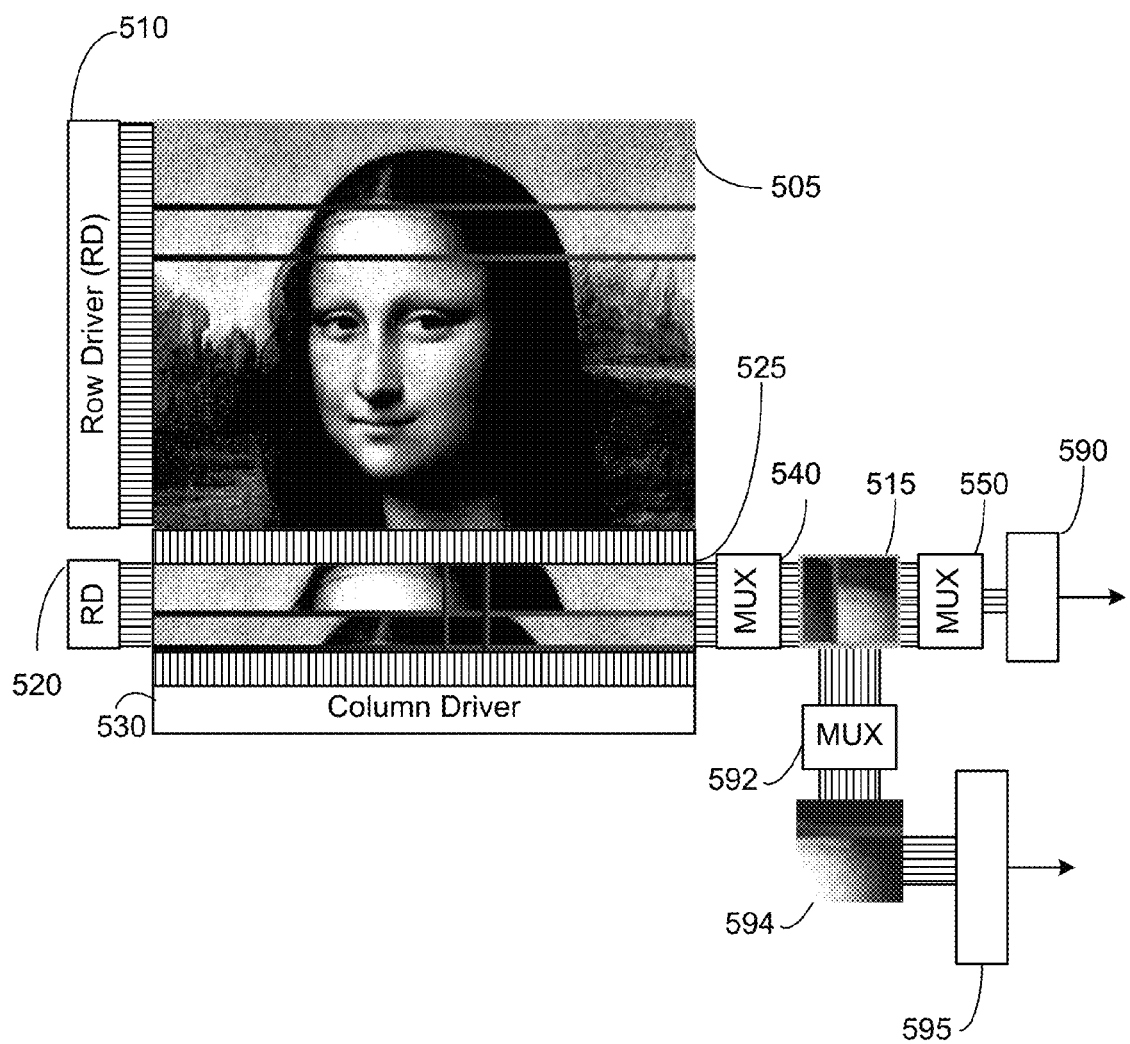
FIG. 5C illustrates a high-level block diagram for implementing a scanning window in hardware in conjunction with a corner-detector.

FIG. 5C illustrates a high-level block diagram for implementing a scanning window in hardware in conjunction with a corner-detector. The high-level block diagram includes a first row driver 510, a second row driver 520, line buffers 525, a column driver 530, a first multiplexer (MUX) 540, and a scanning window array (SWA) 515. The scanning window array 515 can also be connected to a second multiplexer (MUX) 550 and a third multiplexer (MUX) 592. The second multiplexer 550 can be connected to a hardware CV feature computation block 590 comprising circuitry operable to perform CV feature computation, such as a corner detection, that is relatively fast compared to other, more complicated CV features. As illustrated, the CV feature computation block is a Features From Accelerated Segment Test (FAST) corner-detector CV feature computation block 590. A FAST corner-detector implemented in hardware is an example of a hardware means for performing corner detection.

The FAST corner-detector is a corner detection method which can be used to extract feature points and later used to track and map objects in many computer vision tasks. Use of a FAST corner-detector may provide computation efficiency. The FAST corner detector may use a circle of 16 pixels (a with a radius of 3 pixels) to classify whether a subject pixel is actually a corner. If a set of N contiguous pixels in the circle are all brighter than the intensity of candidate or subject pixel p by a threshold value t or all darker than the intensity of candidate pixel p by a threshold value t, then p is classified as corner. There is a tradeoff in choosing N, the number of contiguous pixels, and the threshold value t. N is often chosen as 12. However, in tracking contexts, N can be 9.

In the implementation shown in FIG. 5C, if the CV feature computation block 590 determines that a sample window of the image stored in the scanning window array (SWA) 515 includes a corner, the third multiplexer 592 may remove the vertical tear present in the image stored in the scanning window array (SWA) 515 and store a "tear-free" version of the image in a second hardware scanning window array 594. The second scanning window array 594 can be coupled to control logic, as described with reference to FIG. 5A, and the control logic can provide control signals to control the transfer of pixel values from the SWA 515 to the second hardware scanning window array 594 based on detection of a corner by the hardware CV feature computation block 590 in an image represented by the pixel values stored in the second hardware scanning window array 594. The third multiplexer 592 is shown positioned between the SWA 515 and the second hardware scanning window array 594 and is capable of switching column ordering while transferring the pixel values from the SWA 515 to the second hardware scanning window array, thereby removing a discontinuity (tear) along a column direction in the image. A CV descriptor or CV feature may then be computed directly from the "tear-free" version of the image stored in the second hardware scanning window array 594 (labeled "Descriptor" in FIG. 5C) by comparing values of relevant pixels in hardware using a second CV feature computation block 595 operable to perform computer vision computations based on values stored in the second hardware scanning window array 594. The CV feature computation block is an example of hardware means for performing, via computer vision computation circuitry computer vision computations.

The second CV feature computation block 595 may be dedicated hardware configured to compute a CV feature or CV feature descriptor that is used to label/describe salient points in an image such that visually similar features have similar descriptions. Several binary feature descriptors exist including, but not limited to, Scale-Invariant Feature Transform (or SIFT), Binary Robust Invariant Scalable Keypoints (BRISK), Binary Robust Independent Elementary Features (BRIEF), Oriented FAST and Rotated BRIEF (Orb), and Fast Retina Keypoint (FREAK), to name but a few. The second CV feature computation block 595 may include circuitry configured to compute CV features or descriptors using a sampling pattern (e.g., locations of the pixel used) and sampling pairs (e.g., pixels whose intensities are compared).

In another implementation, the second CV feature computation block 595 may be computed directly from the scanning window array (SWA) 515. In such implementations, second CV feature computation block 595 can be coupled directly to SWA 515 via the third multiplexer 592. Even in such implementations, second CV feature computation block 595 may only be activated if CV feature computation block 590 determines that the sample window stored in SWA 515 includes, for example, a corner. However, removing the vertical tear first may be advantageous because the presence of the vertical tear may have a greater impact on the processing power required since each time second CV feature computation block 595 accesses SWA 515, third multiplexer 592 will remove the vertical tear. In situations where second CV feature computation block 595 will be accessing SWA 515 many times for computation, it can improve efficiency to remove the tear once by storing a tear free image in second hardware scanning window array 594 and computing features and descriptors directly using a tear free image.

In some implementations, a vision sensor may output FAST 590 corner locations and optionally image segments around those detected FAST-detected corners. In such implementations, second hardware scanning window array 594, third multiplexer 592 and descriptor 595 may not be present.

To realize further power savings, some implementations, as illustrated in FIG. 5C, seek to reduce reliance on multiplexers between a hardware scanning window array and a CV feature computation block. If, for example, the computer vision feature or descriptor will be computed by second CV feature computation block 595 in many locations throughout the sample window stored in the scanning window array (SWA) 515, then power savings may be realized by removing the vertical tear with a MUX 592 and having a second tear-free scanning window array to use for computing many, many CV feature or descriptor computations. Furthermore, the removal of the tear can be avoided if the portion of the image in the sample window is unlikely to contain a target object. By gating the transfer of the sample window to the second hardware scanning window array 594 by the detection of a CV feature, for example a FAST corner as illustrated in FIG. 5C, removal of the tear can be avoided and further CV feature or descriptor computation may also be avoided. If the CV feature computation block 590 indicates, for example, that no FAST corner exists in the sample window stored in SWA 515, the SWA 515 simply moves on to another portion of the image as described elsewhere herein without invoking more time-consuming CV feature computations performed in second CV feature computation block 595. Such implementations can reduce power use and increase computational speed and efficiency in implementations where the CV feature computed by CV feature computation block 590, for example a FAST corner detection circuit, uses less power and is faster than the CV feature or descriptor computed by second CV feature computation block 595, for example a SIFT feature descriptor. The CV feature computation block 595 is an example of hardware means for performing computer vision computations based on values stored in the second hardware scanning window array.

Figure 6:
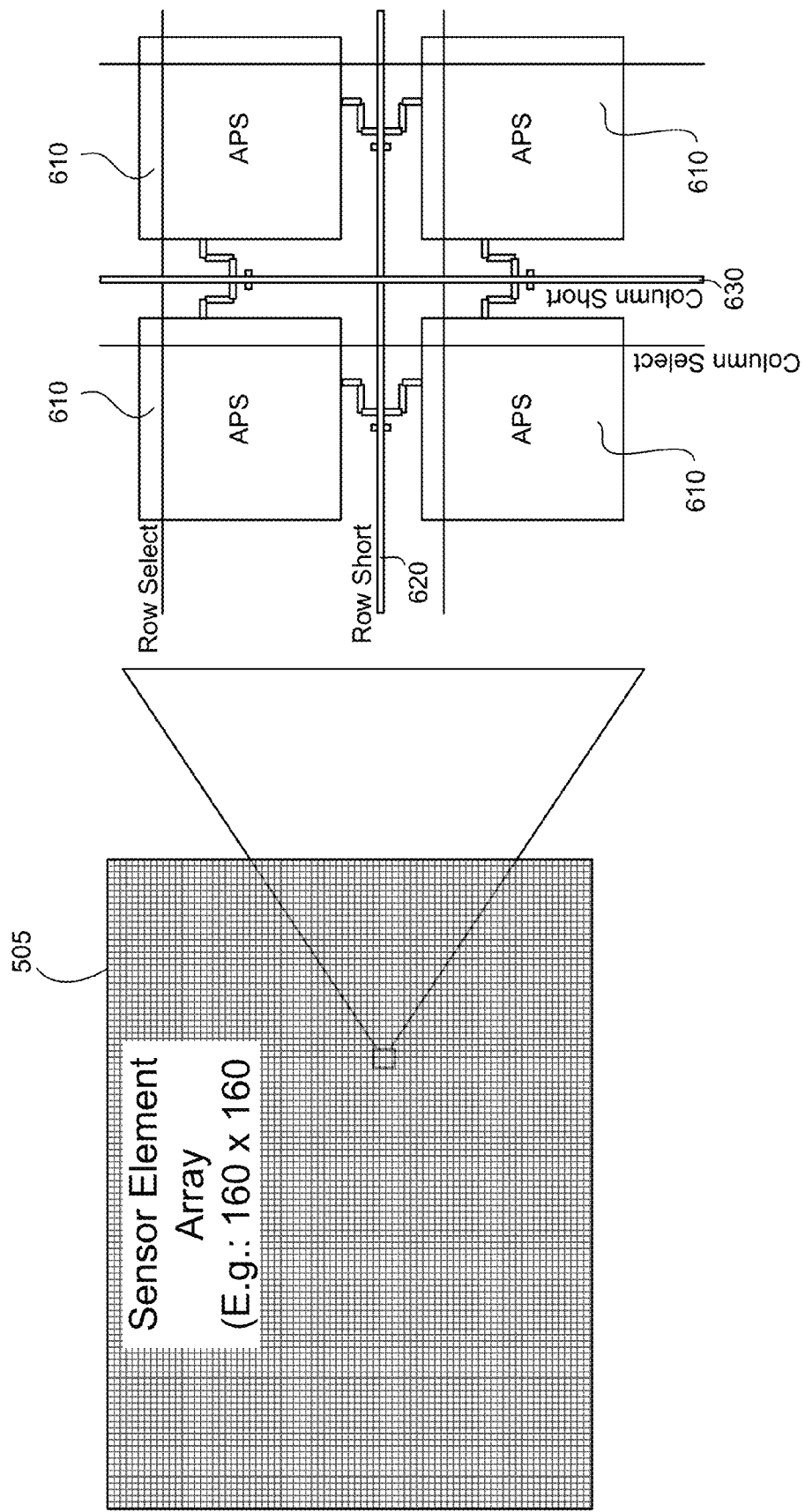
FIG. 6 illustrates a hardware implementation for averaging pixel values in the pixel array, prior to reading the pixels into the line buffers, according to some implementations.

FIG. 6 illustrates a hardware implementation for optionally averaging pixel values in the pixel array 505 (for example, pixel array 505 shown in FIG. 5A or 5B), prior to reading the pixels into the line buffers. Shown in FIG. 6, is an illustrative example of four adjacent pixels (e.g., active-pixel image sensors 610) from the pixel array 505, shown, for purposes of illustration in FIG. 6, as a 160 by 160 pixel array. In between the active-pixel image sensors 610, may lie a row short line 620 and a column short line 630. Additionally, circuits within each pixel may be coupled to each other through two transistors respectively across each of the row short line and the column short line. The transistors may act as "switches" to, for example, connect charge storage elements from neighboring pixels (e.g., short the photodiodes) to average the sensor reading of the pixels). In some implementations, prior to reading the pixels into the line buffers (of FIGS. 5A and 5B), a 2×2 block of pixels may be combined into a single value, thereby reducing the resolution of the image. Once this is accomplished, the reduced resolution image may be scanned into the scanning window array 515 (see FIG. 5). As described elsewhere herein, scanning a reduced resolution image may include skipping rows and columns. It may be advantageous in some implementations to reduce the resolution, scan the lower resolution image into the scanning window array, perform a computer vision feature computation using a computer vision feature computation block 560 (see FIG. 5), and then repeat the process for another, even lower resolution. In such a case, even though the combining is destructive, further resolution reduction can still be accomplished for some (but not all) lower resolutions. For example, when the resolution is reduced by combining a 2×2 block of pixels, a subsequent further reduction of resolution is possible by combining the 2×2 block of pixels with three of its neighboring 2×2 blocks to then create a 4×4 block of pixels. This 4× reduced resolution image may then be scanned into the scanning window array as described elsewhere, and a computer vision feature computation may then be performed. Subsequent reductions in resolution are also possible to 8× (by then combining neighboring 4×4 blocks to create an 8×8 block of pixels) to 16× (by then combining neighboring 8×8 blocks to create a 16×16 block of pixels), etc. It is also understood that resolution reduction can also be accomplished in the pixel array 505 for a 3× reduction, then a 6× reduction, then a 12× reduction, etc. When resolution is reduced in the pixel array 505 in the manner described, it is understood that further resolution reduction may be performed in the scanning window array 515 prior to performing a computer vision feature computation using block 560. Combining full or reduced resolution image readout out of the pixel array 505 with reduction in the scanning window array 515 can provide for intermediate resolution reductions between 1× and 2×, between 2× and 4×, between 4× and 8×, etc., prior to computer vision feature computation. It is understood in the discussion above that combining or averaging pixels, for a 2×2 pixel block for example, in the case of a multicolor image, for example an RGB image, means separately combining the red channels in the 2×2 pixel block to get a single combined red value, separately combining the green channels in the 2×2 pixel block to get a single combined green value, and separately combing the blue channels in the 2×2 pixel block to get a single combined blue value. Hence, combining or averaging pixels for a monochrome image would mean that combining or averaging a 2×2 pixel block results in a single combined value for the block; however, combining or averaging pixels in the case of an RGB image, for example, would mean that combining or averaging a 2×2 pixel block results in three separate values, a combined R, combined G, and a combined B. Similarly, combining or averaging any sized pixel block could result in a multiple values (not just one), the number being equal to the number of color channels in the image, not just one single combined value.

In this example, both the row short line 620 and the column short line 630 may be enabled, completing the transistor circuits and shorting each of the four pixels with one another. Accordingly, each of the four pixels may take on a pixel value that is the average of the four pixels. This process may occur for every pixel in the pixel array 505, and does not necessarily need to be done in a 2×2 fashion as described. In the particular example described, if all the pixels are shorted in the 2×2 fashion, adjacent rows may have the same pixel values. For example, rows one and two may have the same values, rows three and four may have the same values, etc.

In some implementations, scaling of the image can be accomplished by shorting the pixels for local averaging and reading them out again. For example, if the pixel array is 560×560 pixels, the resolution of the image can be changed from 560×560 to 80×80. This process can be repeated if yet even lower resolution is desired, e.g., 40×40. It can be appreciated that reading out the pixels at a lower resolution is optional and the implementation described with respect to FIG. 5 may still provide advantages over existing solutions even without reading out the pixels at a lower resolution. For example, an advantage may be reduced complexity of the CV computation blocks, in comparison to a system that does CV computations on the entire pixel array. In some implementations, it can optionally be desirable to recover the original resolution in the pixel array 505 after the combining, averaging, or scaling described above. In such a case, each pixel may have a sample, hold plus buffer circuit to allow for restoration of the original pixel value at each pixel after the destructive combining operations described. For example, this could allow a sequence of resolution reductions from 1× (full resolution) to 2× (half of the resolution) to 4× (one fourth of the resolution) to 8× (one eighth of the resolution), etc., as described above, to then be followed by a scanning out of the image, after restoring the original values, with any one or more of a 1× (full) resolution image, a 3× (one third) resolution image, a 6× (one sixth) resolution image; or a 1× (full) resolution image, a 5× (one fifth) resolution image, a 10× (one tenth) resolution, etc.

Figure 7:
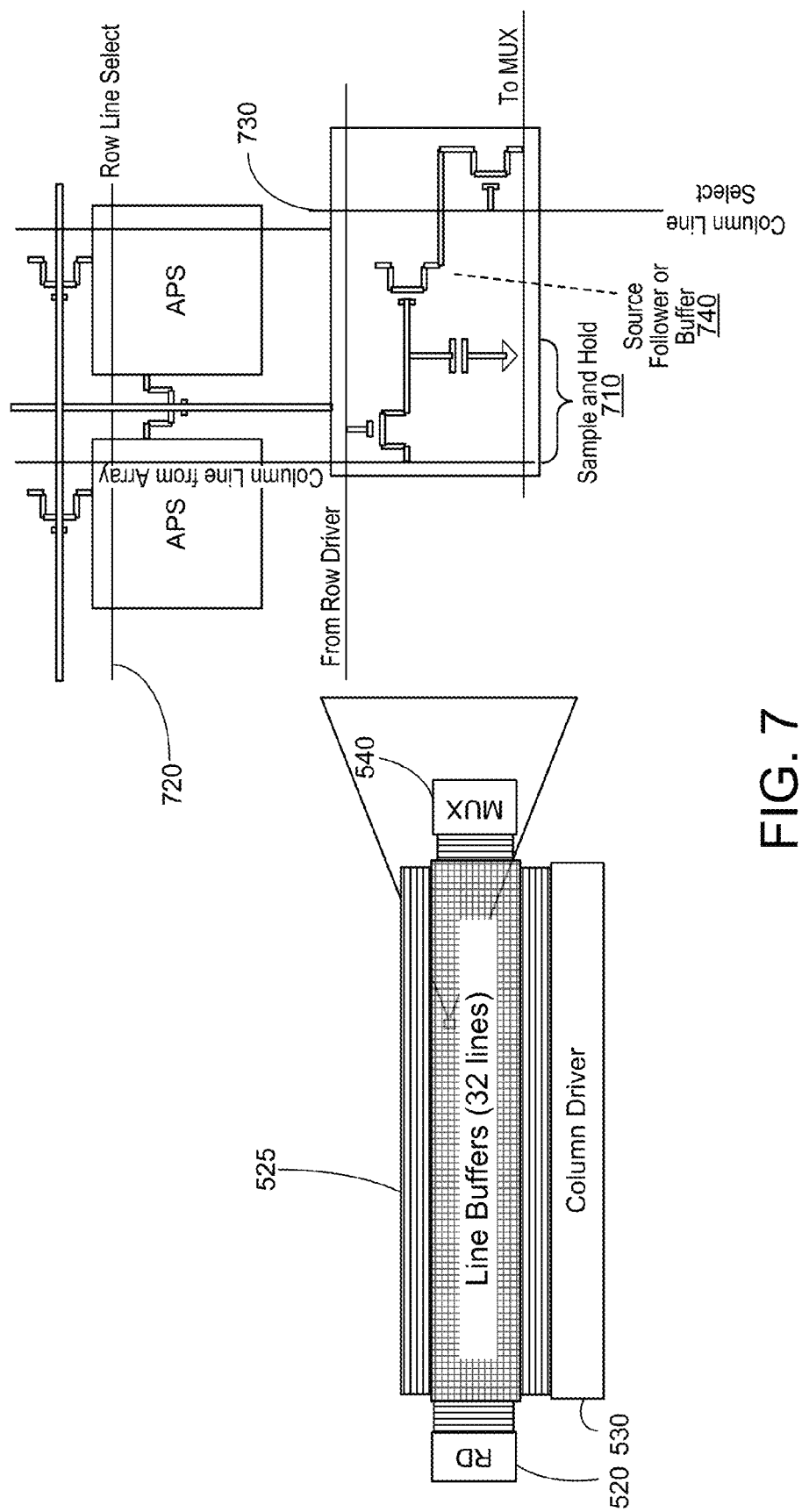
FIG. 7 illustrates a hardware implementation for the line buffers, according to some implementations.

FIG. 7 illustrates a hardware implementation for the line buffers 525. The line buffers 525 may be filled with the pixel values by using sample and hold circuits 710 (for each pixel) along with a horizontal readout of the pixel array. In this example, the line buffers may consist of 32 lines. As described above, the row buffer (via inputs from the logic, memory, and microprocessor block) may select a row from the pixel array to be read by the first row driver. The pixels in the desired row from the pixel array may be selected via the row line select 720 coming from the second row driver 520. The second row driver may then write the rows into the line buffers 525. The sample and hold circuit 710 (for each pixel) may then sample and hold each pixel read from the desired row.

Upon reading all the desired rows and writing them into the line buffers 525, the column driver 540 may then select, via column line select 730, desired columns from the line buffers 525 needed to fill the scanning window array 515.

In some implementations, the desired pixels to fill the scanning window array 515 from the line buffers 525 may then be fed to the first multiplexer 540 without an intervening analog-to-digital converter. This may be accomplished via source follower or buffer 740. As described above, the pixels in the line buffers 525 may suffer from horizontal and/or vertical tear. The hardware to remedy the horizontal and/or vertical tear is described in further detail below. As noted elsewhere, however, in implementations of a digital scanning window array 515, an analog-to-digital converter may first convert the analog values to digital values before the digital values are then fed to the first multiplexer 540.

Figure 8:
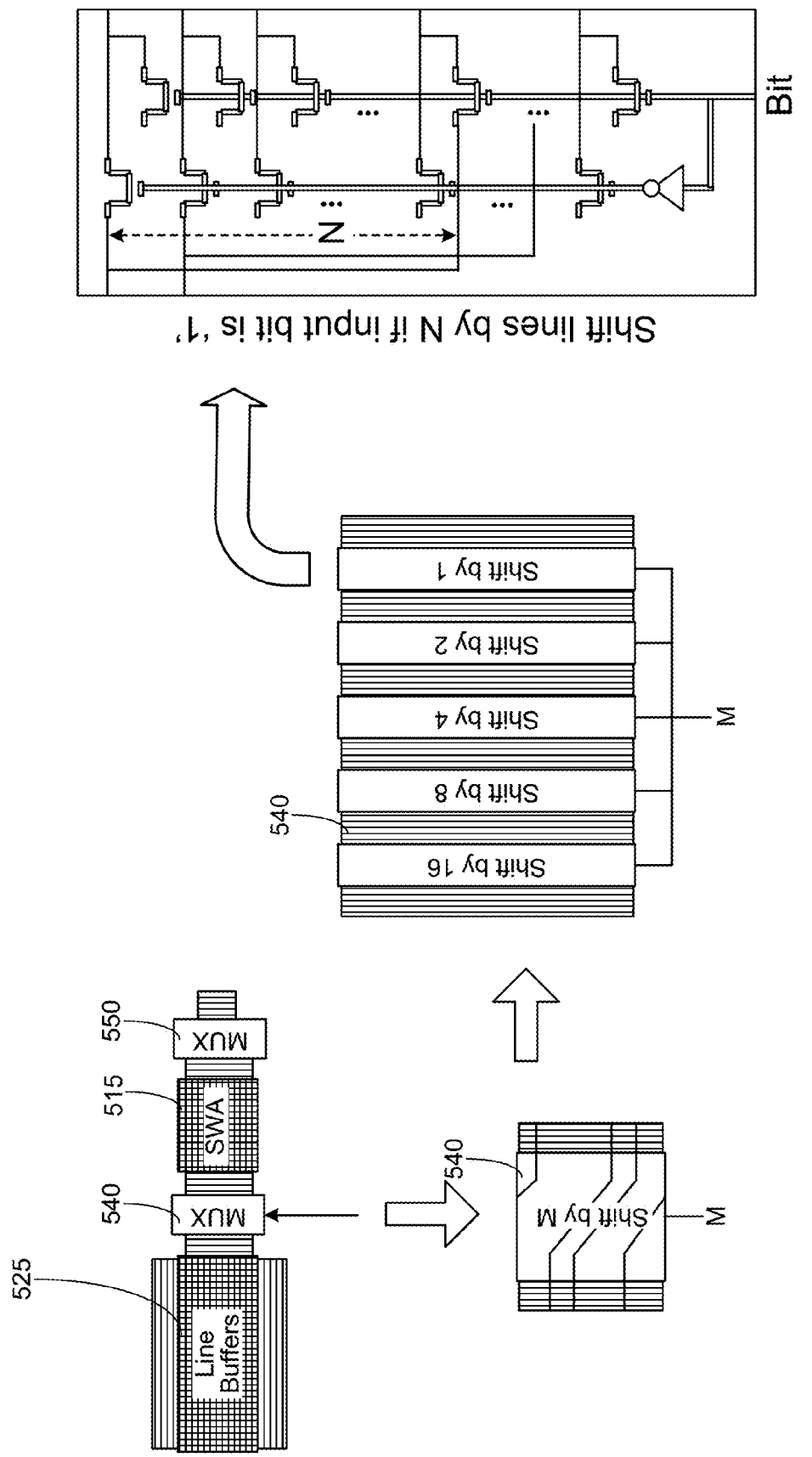
FIG. 8 illustrates a hardware implementation for correcting horizontal and/or vertical tear of the image in the line buffers, according to some implementations.

FIG. 8 illustrates a hardware implementation for correcting horizontal and/or vertical tear of the image in the line buffers 525. The first multiplexer 540 may restore the line order of the rows in the line buffers 525 in order to correct the horizontal tear. In some implementations, a software application configured to interface with the hardware implementation described herein can be aware of where the horizontal tear in the line buffers 525 is located. The software may provide a value (e.g., M) of the location of the tear to the first multiplexer 540 (e.g., providing an instruction to shift by M). In some implementations, the first multiplexer 540 may be able to shift the output from the line buffer by up to 31 lines (e.g., by having circuits to shift by 16, 8, 4, 2, and 1). In the case where the tear location is 1 (e.g., M=1), the first multiplexer 540 may shift the lines by M.

It can be appreciated that the vertical tear can be corrected in the same manner with the addition of another multiplexer after the line buffers 525 (not shown).

The scanning window array 515 may now hold a copy of the image from the pixel array at a specified location. The desired location of the image can be scanned in a raster fashion with the hardware circuits described herein, or in some implementations can be software controlled. Additionally the desired location of the image can be changed on-demand for tracking purposes.

In some implementations, the hardware circuits described herein may also be used for intensity-based image readouts similar to traditional camera sensors.

Multi-Block Computer Vision Feature Implementation in Hardware

In some implementations, the hardware circuits described herein can also include configurable combining circuitry. The configurable combining circuitry can be coupled to the plurality of storage elements, and can be enable the computation of multi-block computer vision features in hardware.

Figure 9:
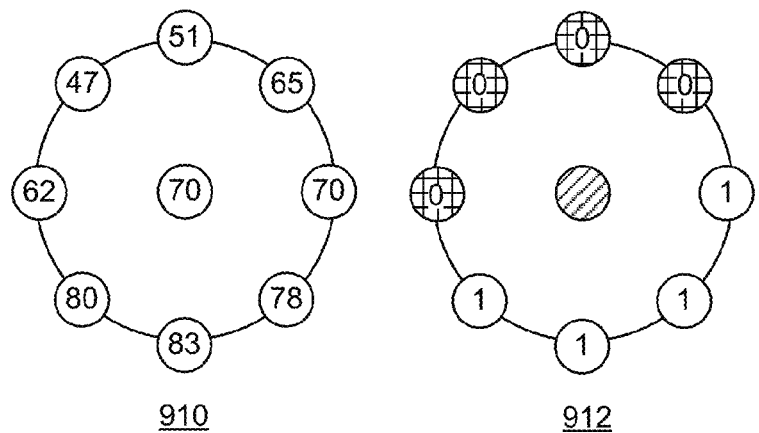
FIG. 9 illustrates a known local binary patterns (LBP) computer vision feature implementation, according to some implementations.
Figure 9:
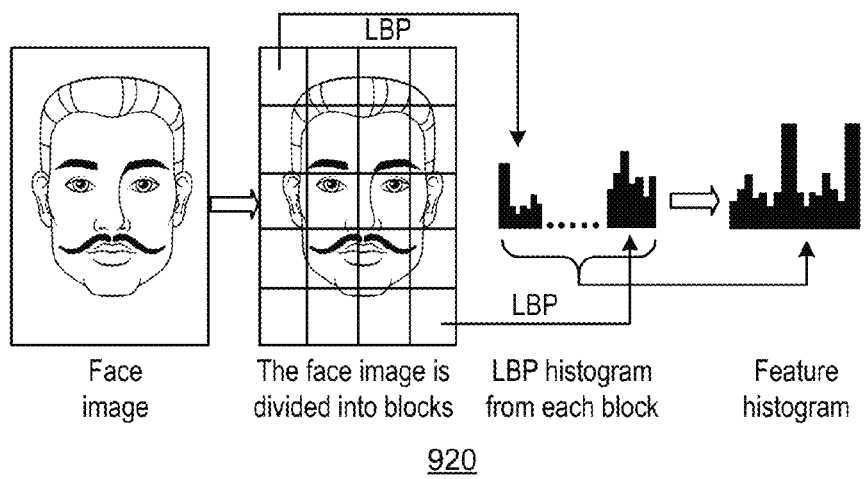
Figure 9:
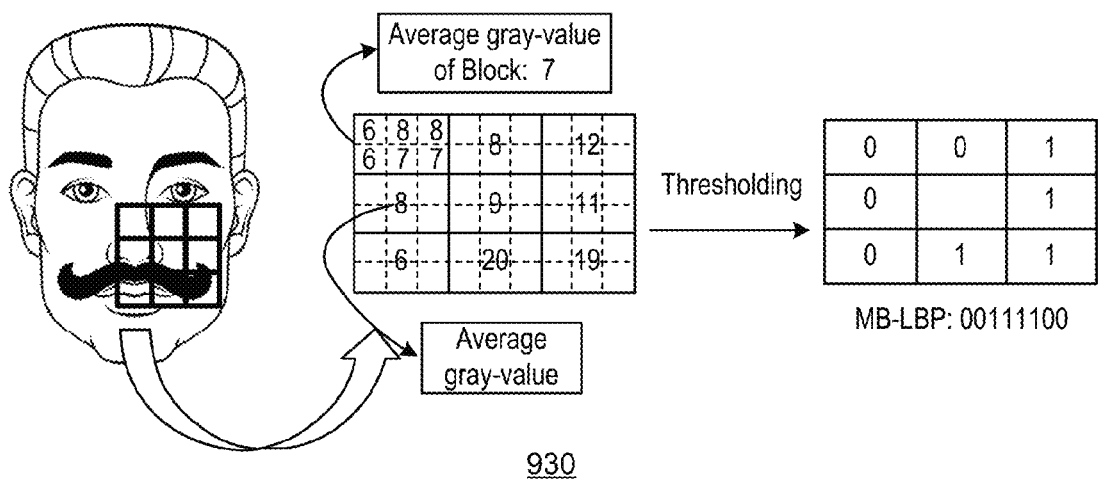

FIG. 9 illustrates an local binary patterns (LBP) computer vision feature implementation. A group of nine pixels 910 is shown, with one pixel surrounded by the remaining eight pixels. The neighboring pixels can be used to calculate an LBP. For each pixel, the pixel may be compared to each of its eight neighboring pixels (on its left-top, left-middle, left-bottom, right-top, etc.). Where the center pixel's value is greater than the neighboring pixel's value, the neighboring pixel value can be written as a one. Otherwise, the neighboring pixel's value can be written as a zero, shown as element 912. From the values of eight neighboring pixels, an 8-digit binary number can be obtained. A histogram can then be computed, over the cell made up of the nine pixels, of the frequency of each 8-digit binary number occurring (e.g., each combination of which pixels are smaller and which are greater than the center), as shown in element 920. In some cases, the histogram can be optimally normalized. A similar operation on all the cells within the window can be performed and the histograms of all the cells can be concatenated, shown in 920. This may allow for obtaining the feature vector of the window. The feature vector can then processed using a machine-learning algorithm to classify images for face recognition or other object analysis.

The pixels may be stored within a hardware array, such as a scanning window array, that includes a plurality of storage elements arranged along a first dimension (e.g., rows) and a second dimension (e.g., columns) of the hardware array. Each of the storage elements can store analog or digital pixel values. The storage elements may be capacitors in an some implementation, for example, or a hardware array capable of storing digital values in a digital implementation, such as a random-access memory (RAM) array. In some implementations, hardware scanning window array can allow for summation or averaging of pixel values to generate sums or averages of the pixels within a block. In one example, this can be accomplished in implementations such as those discussed with reference to FIG. 5B where sample windows of an integral image (or integral images of sample windows of the original image) are stored in the hardware scanning window array, allowing computationally efficient calculation of averages or sums of pixel values. In other implementations, the hardware scanning window array can include circuitry that allows the summation or averaging of blocks within or without the array. In the various approaches, weighted sums or averages of pixel values can be computed for blocks varying in size (2 by 2 pixel, 3 by 3 pixel, 4 by 4 pixel, etc.). In some implementations, blocks or cells as large as 11 by 11 pixels, or larger, may be combined, summed, or averaged. An LBP operation can then be performed, in hardware, on a cell comprising, for example, a 3 block by 3 block cell, as shown in element 930.

Additionally, multi-block LBP (as opposed to pixel-level LBP, as described above) can be used for a more robust feature vector. For ease of discussion, the remaining disclosure will discuss LBP and multi-block LBP in the context of averaged pixel values from a block or cell of pixels, but it is understood that weighted sums or other combinations of pixel values may also be used in various implementations instead of pixel value averages. Multi-block LBP can first obtain the average pixel values for all the pixels in a block. For example, in 930, the top-left block has six pixels with pixels values: 6, 8, 8, 6, 7, 7 (clockwise). Multi-block LBP can first compute the average value of these six pixels, which is 7. This can be repeated for each block within the window. For example, the average values for the pixels in the window shown is 7, 8, 12, 8, 9, 11, 6, 20, and 19. The traditional LBP operation can then be performed on the multi-block cell by treating the blocks as "pixels", e.g., values of zero or one are written to neighboring blocks surrounding the center block. As can be seen in the figure, the result of the LBP operation results in the following written values: 0, 0, 1, 0, 1, 0, 1, 1. The traditional LBP operation may then continue as described above. The example illustrated in element 930 is understood to optionally include some thresholding. For example, in some implementations, the LBP operation on blocks surrounding the central block with the average value of 9 will yield a result of "1" (or other binary number) for blocks that are greater than the value 9 by a certain threshold. Similarly, in some implementations, thresholding can be simultaneously or independently performed such that the LBP operation on blocks surrounding the central block with the average value of 9 will only yield a result of "0" (or other binary number) for blocks that are less than the value 9 by a certain threshold. In some variants of LBP, for example local tertiary patterns (LTP), thresholding can be performed so that the LBP operation on blocks surrounding the central block with the average value of 9 will yield one of three values: a "−1" for blocks that are less than the central block by a certain value, a "0" for blocks that are within the threshold compared to the value of the central block, or a "1" for blocks that are more than the central block by the threshold value. In a similar way, other computer vision algorithms, such as histogram of signed gradients (HSG), may benefit from block-level averaging of multiple pixel values. Some hardware implementations for multi-block LBP are described in further detail below.

Figure 10A:
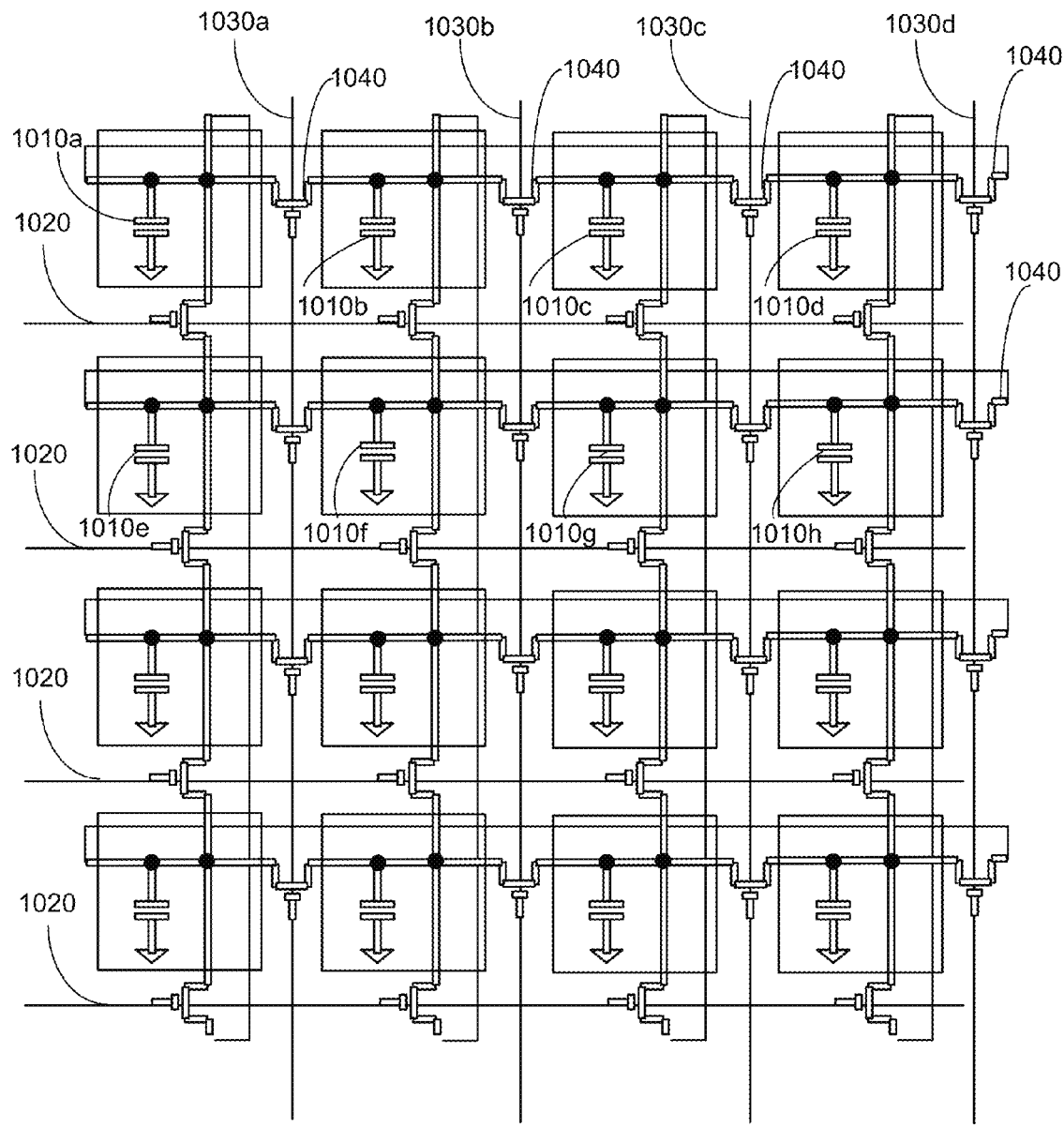
FIG. 10A illustrates a hardware implementation for a multi-block computer vision feature implementation, according to some implementations.

FIG. 10A illustrates a hardware implementation for a multi-block computer vision feature implementation. The hardware described with respect to FIG. 10A may be provided as a scanning window array (SWA) that holds the contents of a sub-image of a larger image defined by a sliding sample window superimposed over the larger image. In some implementations, the scanning window array image may be made available in hardware as a charge on an array of capacitors corresponding to pixel values. The scanning window array image may contain horizontal and/or vertical tears, which can be a resulting artifact from reading the scanning window image from the original image. Furthermore, prior to the scanning of the sub-image into the SWA from a larger array, for example an array of pixels as a part of an optical sensor or camera sensor system, pixel values of the pixel array may be combined or averaged, or the original resolution of the image in the pixel array may have been reduced. Hence, any pixel value combining or averaging described herein may represent a further reduction in resolution of the image relative to the original resolution. This can be advantageous for some computer vision feature computations or operations.

Figure 10B:
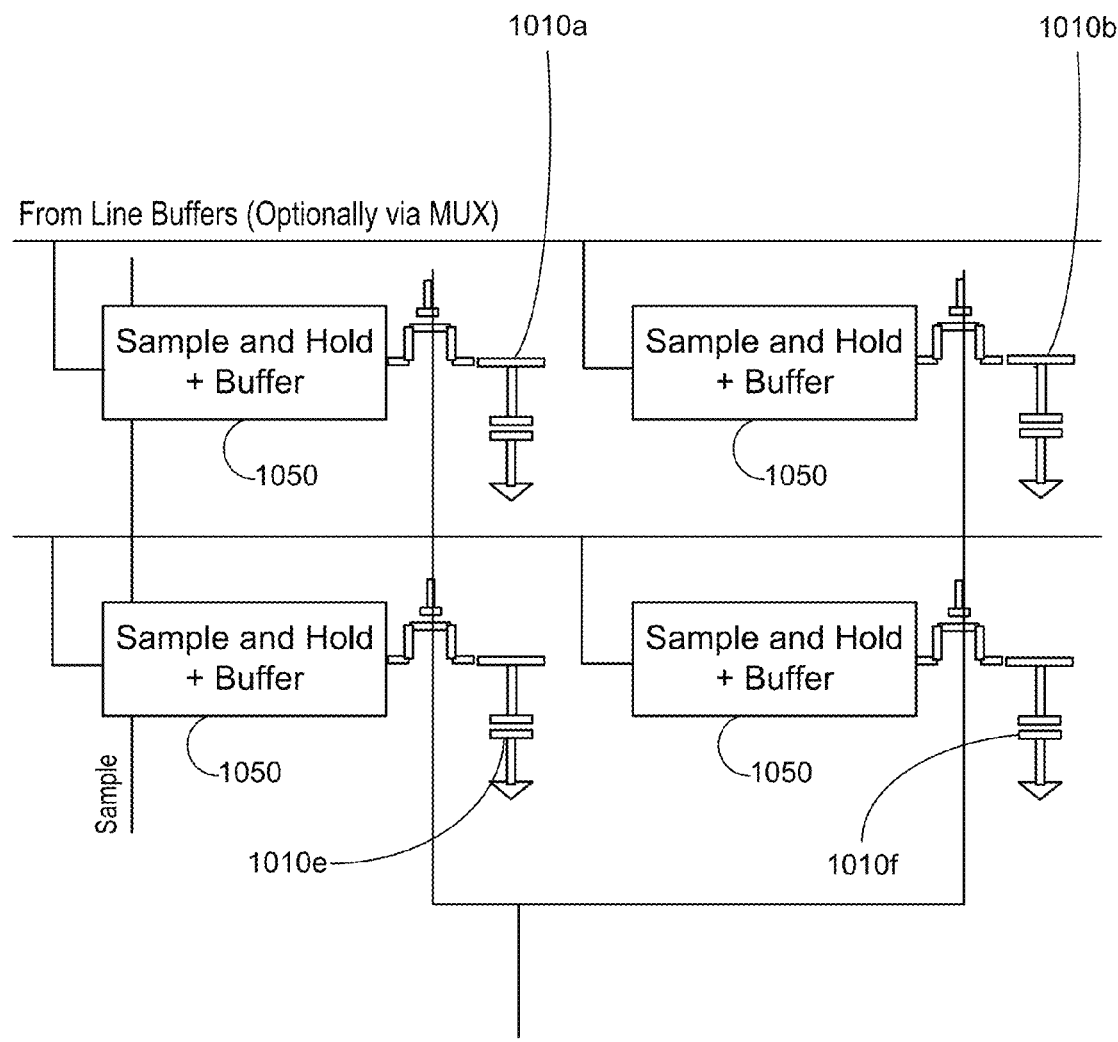
FIG. 10B illustrates sample and hold buffers which may be included as part of the hardware implementation for the multi-block computer vision feature implementation, according to some implementations.

If the SWA is made available by hardware, in one implementation, for example an implementation where the SWA storing pixel values and the computer vision computations will be performed using circuitry, the pixel values may be stored as charges on capacitors 1010 (e.g., 1010a, 1010b, 1010c, 1010d) charged up from a sample and hold buffer associated with each pixel (see FIG. 10B, not shown in FIG. 10A for clarity). FIG. 10A shows a plurality of capacitors 1010, each capacitor 1010 associated with a pixel and storing a pixel value by maintaining a charge. The transistors can be activated by driving column short lines 1030a, 1030b, 1030c, 1030d or a row short lines 1020. For example, if the leftmost column short line 1030a in the figure is driven, the leftmost capacitor 1010a in the upper row may be shorted to the second to left capacitor 1010b in upper row and the leftmost capacitor 1010e in the lower row may be shorted to the second to left capacitor 1010f in the lower row. The value of the shorted pixels may be read out and fed to a multiplexer that can select the desired pixel values of interest. The capacitors may be controlled by configurable combining circuitry coupled to the capacitors. The configurable circuitry can combine, in hardware, multiple pixel values from the capacitors, to generate combined pixel values according to different combining patterns (for example, see FIG. 10C). The configurable circuitry is an example of hardware means for combining some multiple pixel values to generate a first set of combined pixel values according to a first combining pattern. Such combined pixel values can represent an average of the pixel values thus combined. It can be appreciated that combining of the pixel values can be performed on any dimension of the scanning window array. For example, pixel values within a 2×2, 3×3, 4×4, 5×5, or N×N block within the scanning window array can be combined (for example, averaged). More generally, pixel values within a 1×2, 2×1, 2×3, 3×2, 3×4, 4×3, or M×N (where M or N may also be equal to 1) pixel block within the scanning window array can also be combined (for example, averaged). While the array shown in FIG. 10A is a 4 by 4 array of capacitors, it is understood that the SWA may be larger, depending upon the application. In some implementations, the SWA may be a 32×32 array. In some implementations, the SWA may be rectangular and may be an M×N array.

The configurable circuitry can include row short lines (e.g., first controllable connections operable to connect adjacent circuit elements along the row) and column short lines (e.g., second controllable connections operable to connect adjacent circuit elements along the column). The circuitry can allow for a first destructive combining of some of the multiple pixel values to generate a set of combined pixel values based on the combining pattern. The capacitors in the array can then be re-loaded with the data from the sample and hold plus buffer circuit (see FIG. 10B). The destructive combining can be repeated for subsequent combining of other pixels according to another combining pattern. It can be appreciated that other pixels does not necessarily mean mutually exclusive pixels. For example a new group of pixels can include one or more pixels from the previous combining operation. Combining of the pixel values can generate averaged pixel values for a block comprising the adjacent sensor elements being connected. For example, it may be desirable to combine 2×2 pixel blocks prior to CV feature computation. Subsequently, it may be desirable to combine 3×3 pixel blocks prior to CV feature computation. Since the pixel value combination is destructive (for example, shorting capacitors as described above with respect to FIG. 10A), to perform a 3×3 pixel block combination after having performed a 2×2 pixel block combination restoring the original pixel values within the SWA. Sample and hold plus buffer circuit 1050 as shown in FIG. 10B allows for the recovery of the original pixel values after destructive combining or averaging is performed.

Figure 10C:
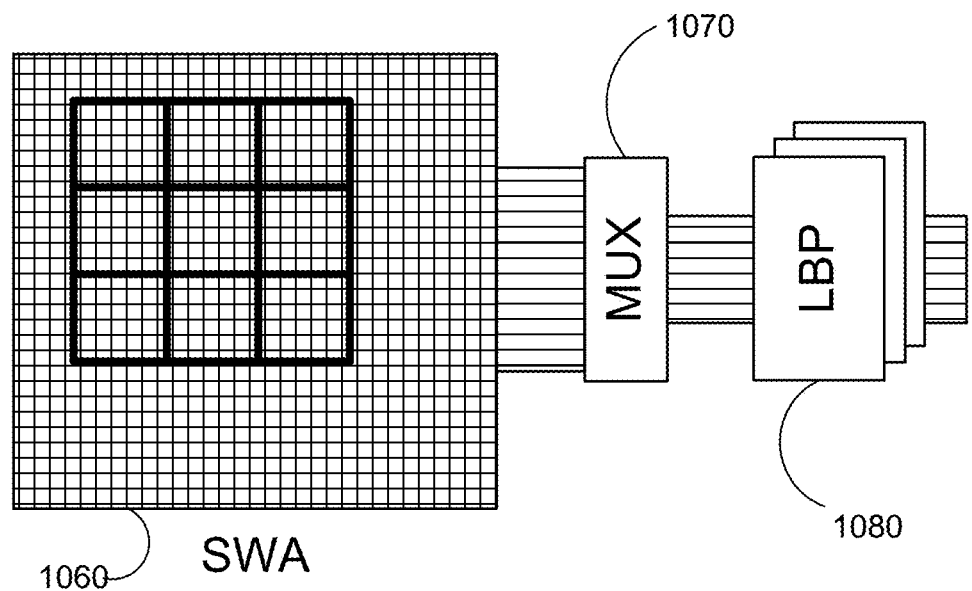
FIG. 10C illustrates a readout from a scanning window array to a computer vision computation block, according to some implementations.

FIG. 10C illustrates a SWA connected to a computer vision (CV) feature computation block 1080, labeled LBP, but it is understood that other computer vision feature computation operations may be performed in hardware, such as HSG, FAST corners, or Haar-like features. The multiplexer (MUX) 1070 can be useful in dealing with tears in the image represented in the SWA prior to local binary patterns (LBP) 1080 or other hardware-based CV feature computation. It is also worth noting that the SWAs 1060 described herein allow for the temporary storing, possible combination and/or averaging, or re-arranging of pixels prior to a hardware-based CV feature computation. In the discussion above, each pixel value in an image was assumed to have a single value, as in a monochrome image. However, it is understood that for a multicolor image, a pixel will not have a single value, but will have multiple values, for example three values in the case of an (red-green-blue) RGB image. Hence, in the example of an RGB image, the SWA 1060 described above may actually be a scanning window comprising three sub-arrays: a red SWA, a green SWA, and a blue SWA (not illustrated as separate sub-arrays in FIG. 10C). The computer vision feature computation blocks shown in FIG. 10C (labeled "LBP") 1080 may be shared by the different color channel SWAs, or different colors may have dedicated computer vision feature computation blocks. Similarly, the MUX 1070 illustrated could be shared or each color may have a dedicated MUX 1070. Furthermore, it is understood in the discussion above that combining or averaging pixels, for a 2×2 pixel block for example, in the case of a multicolor image, for example an RGB image, means separately combining the red channels in the 2×2 pixel block to get a single combined red value, separately combining the green channels in the 2×2 pixel block to get a single combined green value, and separately combing the blue channels in the 2×2 pixel block to get a single combined blue value. Hence, combining or averaging pixels for a monochrome image would mean that combining or averaging a 2×2 pixel block results in a single combined value for the block; however, combining or averaging pixels in the case of an RGB image, for example, would mean that combining or averaging a 2×2 pixel block results in three separate values, a combined R value for the block, a combined G value for the block, and a combined B value for the block. Similarly, combining or averaging any sized pixel block could result in a number of values (not just one), the number being equal to the number of color channels in the image. In implementations where the SWA is storing a portion of an integral image based on pixel values based on sensor readings from the sensor array, it is understood that the SWA may also include three sub-arrays holding an integral image for each color channel.

Figure 10D:
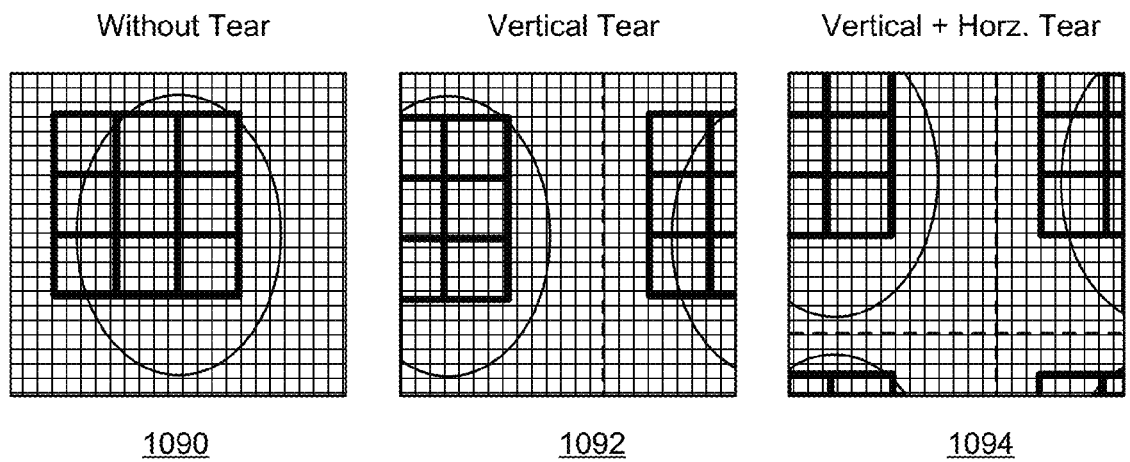
FIG. 10D illustrates differences between no tear, a vertical tear, and a vertical and horizontal tear in an image stored within the scanning window array, according to some implementations.

In some implementations, the combining may appropriately handle a vertical and/or horizontal tear present in the image stored in the scanning window array as a result of the use of a round-robin line buffer to fill the scanning window array with values from a hardware sensor array, as illustrated in FIG. 10D. For example, if the vertical tear is located in between capacitor 1010a and 1010b, pixel values 1010b and 1010c can be shorted and pixel values 1010d and 1010a can be shorted (see FIG. 10A). A multiplexer can then be used to read the column values in the correct order (e.g., beginning at 1010b). For example, as shown in FIG. 10D for a vertical tear 1092, the pixels within a single block include pixels in the last column (far right of the SWA) and pixels in the first two columns (far left of the SWA); hence when shorting all pixels in a block in such a situation, some pixels on the far right will be shorted with pixels on the far left. Similarly, for the example shown of both a vertical and a horizontal tear 1094, pixels that are within a single block that are to be averaged include pixels that are in the first two rows and in the bottom row. In this example, a block that traverses a corner may then be averaged by shorting pixels from all four corners (the 2×2 pixel group in the upper left will be shorted with the 2×1 pixel group in the upper right corner and the 1×1 pixel in the lower right corner and the 1×2 pixel group in the lower left corner).

Once the capacitors are shorted and average pixel values are determined for each pixel within each block within the scanning window array, a multi-block LBP operation, or any other computer vision operation, can be carried out (see FIG. 10C). The combined (e.g., averaged) pixel values in the scanning window array can be selected appropriately by a multiplexer and then fed to the multi-block LBP circuit (or other CV feature computation circuit). By implementing the multi-block LBP in hardware, the LBP operation can be performed multiple times with blocks of varying locations within the SWA and/or of varying sizes (number of pixels combined or averaged).

Figure 11:
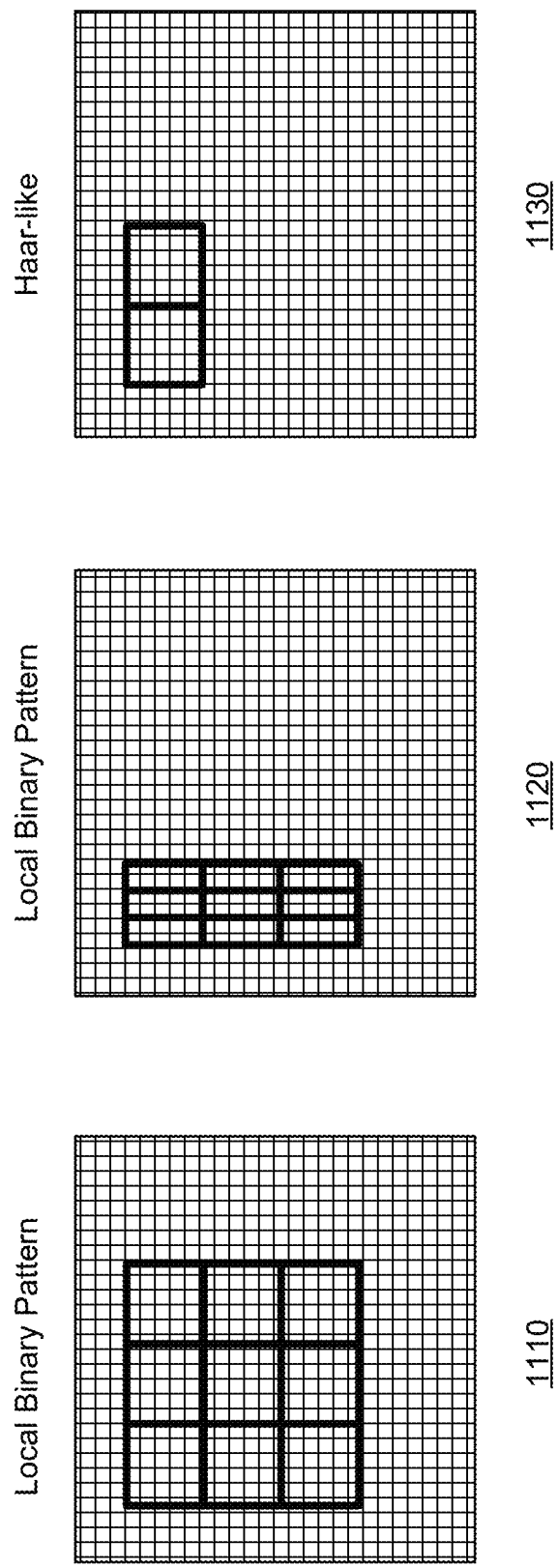
FIG. 11 illustrates examples of computer vision (CV) features that can be calculated using the hardware implementation described herein, according to some implementations.

For example, as shown in FIG. 11, the size for a number of blocks can vary. In example 1110, a block represents a combining of a 3×3 group of pixels, and there is a 3×3 cell of blocks. In example 1120, a block represents a combining of a 3×1 group of pixels and there is a 3×3 cell of blocks. Examples 1110 and 1120 may be used, for example, in an LBP or HSG hardware CV feature computation. In example 1130, a block represents a combining of a 3×3 group of pixels, and there is a 1×2 cell of blocks. In some implementations, the computer vision operation is optional.

In some implementations, multiple circuit variations can be implemented using the same principle for other types of CV features, such as Haar-like features. A software application can turn on the desired circuit variation as needed. In some implementations, an analog-to-digital converter (ADC) can be used for pixel intensity readout. It can be appreciated that any other circuit elements can be added for further processing (e.g., convolutions, deep learning, etc.). These additional circuit elements can be used in isolation or in combination.

The multi-block LBP can be performed using computer vision computation circuitry coupled to the configurable combining circuitry. The computer vision computation circuitry can perform, in hardware, computer vision computations based on combined pixel values. The computer vision computation circuitry is an example of hardware means for performing computer vision computations.

In the scanning window array (SWA) of FIG. 10A, transistors are shown to enable shorting of capacitors that are adjacent along a row (for example, shorting capacitors 1010a and 1010b) or capacitors that are adjacent along a column (for example, shorting capacitors 1010a and 1010e). However, it is understood that the transistors can be arrange to allow for other forms of combining pixel values. For example, transistors can be configured to further allow combining of capacitors diagonally. In this implementation, a transistor (not shown) could be provided to short, for example, capacitor 1010a with capacitor 1010f. This could allow for the computation of blocks that are at an angle relative to the SWA (for example, the 3 block by 3 block cell shown superimposed on SWA could be at an angle relative to the SWA).

Figure 12:
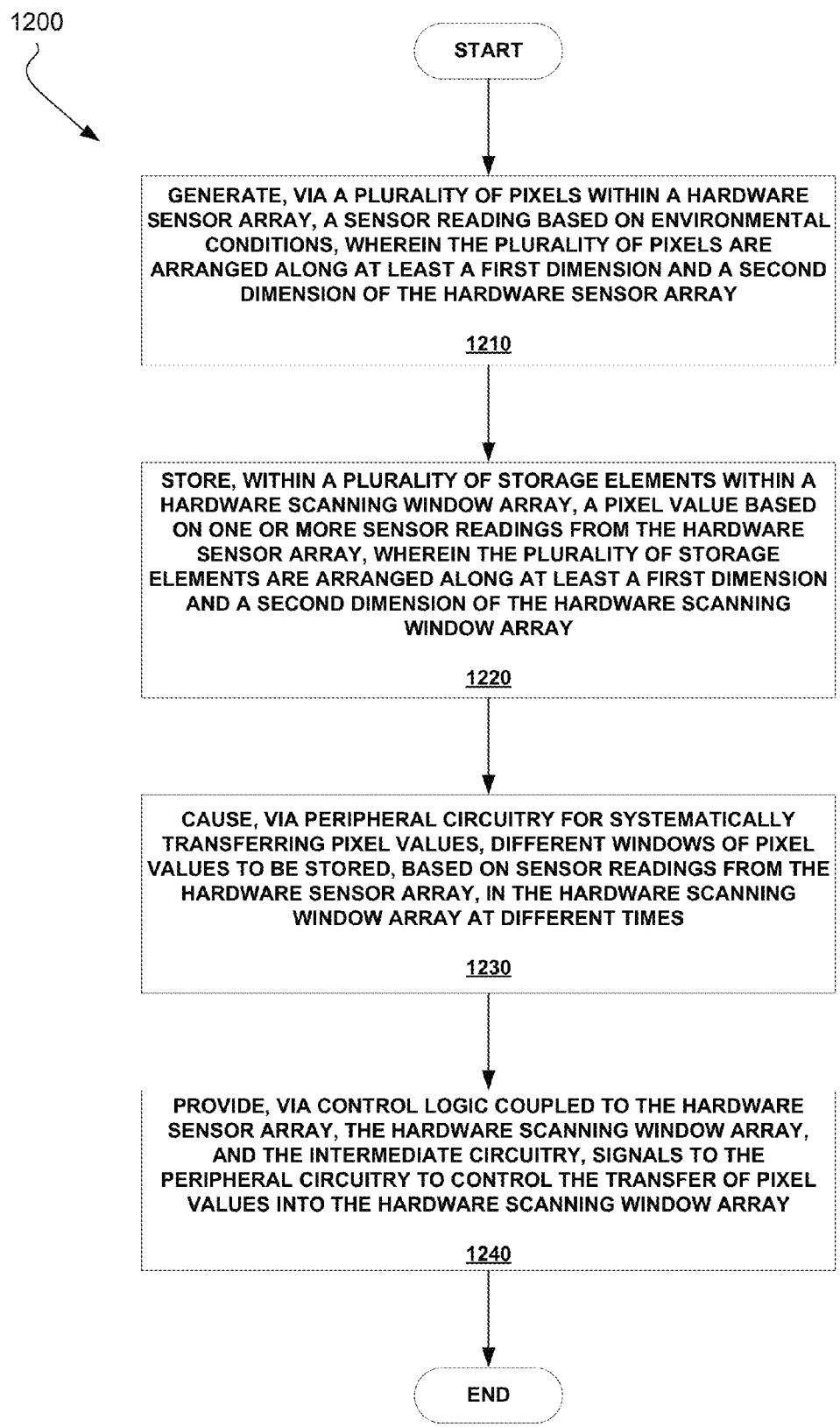
FIG. 12 is a flowchart of a method for isolating pixel values in hardware.

FIG. 12 is a flowchart 1200 of a method for isolating pixel values in hardware. In block 1210, a sensor reading based on environmental conditions may be generated via a plurality of pixels. The plurality of pixels may be arranged along at least a first dimension and a second dimension of the hardware sensor array. The hardware sensor array may be a sensor for a camera. For example, in FIG. 5, the pixel array (e.g., hardware sensor array) stores pixel values based on environmental conditions. In this example, pixel values representing a portrait of a woman are stored in the pixel array.

In some implementations, the hardware sensor array may also include configurable combining circuitry coupled to the plurality of pixels, the configurable combining circuitry operable to combine, in hardware, multiple sensor readings from the plurality of pixels to generate the pixel values, according to at least one combining pattern. The configurable combining circuitry may include a first plurality of controllable connections operable to connect adjacent pixels along the first dimension of the hardware sensor array and a second plurality of controllable connections operable to connect adjacent pixels along the second dimension of the hardware sensor array. When the adjacent pixels are connected, averaged pixel values may be generated at each of the adjacent pixels being connected. It can be appreciated that performing the averaging may be optional with respect to flowchart 1200.

In block 1220, a pixel value based on one or more sensor readings from a hardware sensor array may be stored within a plurality of storage elements within the hardware scanning window array. The plurality of storage elements may be arranged along at least a first dimension and a second dimension of the hardware scanning window array. For example, in FIG. 5A, a portion of the pixel values based on sensor readings from the pixel array are stored in the scanning window array.

In block 1230, different windows of pixel values to be stored may be caused to be stored via peripheral circuitry for systematically transferring pixel values. The pixel values to be stored may be based on sensor readings from the hardware sensor array, in the hardware scanning window array at different times. In some implementations, the peripheral circuitry may include a line buffer comprising a plurality of storage elements arranged along at least a first dimension and a second dimension of the line buffer, the first dimension of the line buffer being smaller than the first dimension of the hardware sensor array, the second dimension of the line buffer being equal to the second dimension of the hardware sensor array. For example, in FIG. 5, the first row driver, second row driver, and column driver cause the pixel values from the pixel array to be stored in the line buffers.

In block 1240, signals to the peripheral circuitry to control the transfer of pixel values into the hardware scanning window array may be provided. The signals may be provided via control logic coupled to the hardware sensor array, the hardware scanning window array, and the peripheral circuitry. For example, in FIG. 5, the logic, memory, microprocessor block sends signals to the first and second row drivers, column driver, and first multiplexer to transfer pixel values into the hardware scanning window array.

In some implementations, the control logic may be capable of storing a next row of pixel values from the hardware sensor array into the line buffer, by replacing an oldest row of pixel values in the line buffer, thereby introducing a discontinuity along a row direction in an image represented by the pixel values stored in the line buffer. However, the peripheral circuitry may include a switch circuit positioned between the line buffer and the hardware scanning window array, the switch circuit capable of switching row ordering while transferring pixel values from the line buffer to the hardware scanning window array, thereby removing the discontinuity along a row direction in an image represented by the pixel values stored in the line buffer. For example, in FIG. 5, the first multiplexer functions as the switch circuit capable of switching row ordering. Further, in some implementations, the peripheral circuitry may also include a switch circuit positioned between the hardware scanning window array and a computer vision feature computation block, the switch circuit capable of switching column ordering while transferring pixel values from the hardware scanning window array to the computer vision feature computation block, thereby removing the discontinuity along a column direction in an image represented by the pixel values stored in the hardware scanning window array. For example, in FIG. 5, the second multiplexer functions as the switch circuit capable of switching column ordering.

In some implementations, the method can also include combining, via configurable combining circuitry coupled to the plurality of storage elements, of some multiple pixel values to generate a first set of combined pixel values according to a first combining pattern, while maintaining the multiple pixel values for subsequent combining of some other multiple pixel values to generate a second set of combined pixel values according to a second combining pattern. For example, in FIG. 9, the different pixel values are combined according to a first combining pattern and a second combining pattern. The first and second set of combined pixel values can, in some implementations, include an average of the combined pixel values. Alternatively, combined pixel values can include a sum of the combined pixel values. In another implementation, combined pixel values can include a largest pixel value among the combined pixel values.

In some implementations, the method may further include performing, via computer vision computation circuitry coupled to the configurable combining circuitry, computer vision computations. The computer vision computations may include a first computer vision computation based on the first set of combined pixel values and a second computer vision computation based on the second set of combined pixel values, as part of a multi-block local binary (LBP) operation. For example, in FIG. 9, a multi-block LBP operation is performed on the combined pixel values.

Figure 13:
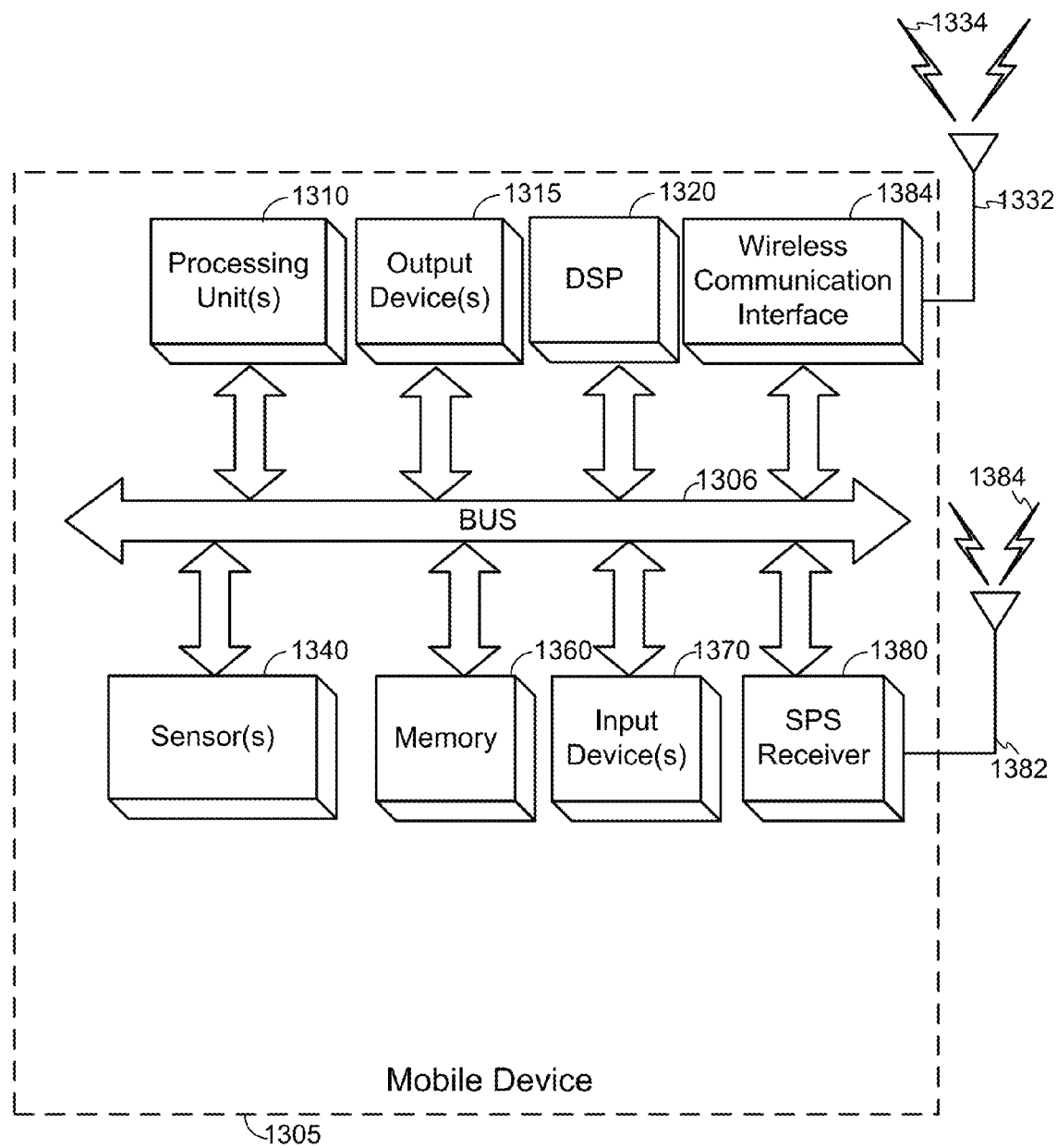
FIG. 13 illustrates an example of a computing system in which one or more implementations may be implemented.

FIG. 13 illustrates an implementation of a mobile device 1305, which can utilize the sensor system as described above. It should be noted that FIG. 13 is meant only to provide a generalized illustration of various components, any or all of which may be utilized as appropriate. It can be noted that, in some instances, components illustrated by FIG. 13 can be localized to a single physical device and/or distributed among various networked devices, which may be disposed at different physical locations.

The mobile device 1305 is shown comprising hardware elements that can be electrically coupled via a bus 1306 (or may otherwise be in communication, as appropriate). The hardware elements may include a processing unit(s) 1310 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 13, some implementations may have a separate DSP 1320, depending on desired functionality. The mobile device 1305 also can include one or more input devices 1370, which can include without limitation a touch screen, a touch pad, microphone, button(s), dial(s), switch(es), and/or the like; and one or more output devices 1315, which can include without limitation a display, light emitting diode (LED), speakers, and/or the like.

The mobile device 1305 might also include a wireless communication interface 1330, which can include without limitation a modem, a network card, an infrared communication device, a wireless communication device, and/or a chipset (such as a Bluetooth™ device, an Institute of Electrical and Electronics Engineers standard (IEEE) 302.11 device, an IEEE 302.15.4 device, a WiFi device, a WiMax device, cellular communication facilities, etc.), and/or the like. The wireless communication interface 1330 may permit data to be exchanged with a network, wireless access points, other computer systems, and/or any other electronic devices described herein. The communication can be carried out via one or more wireless communication antenna(s) 1332 that send and/or receive wireless signals 1334.

Depending on desired functionality, the wireless communication interface 1330 can include separate transceivers to communicate with base transceiver stations (e.g., base stations of a cellular network) access point(s). These different data networks can include various network types. Additionally, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ Long-Term Evolution (LTE), LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A Wireless Local Area Network (WLAN) may also be an IEEE 802.11x network, and a Wireless Personal Area Network (WPAN) may be a Bluetooth network, an IEEE 802.15x, or some other type of network. The techniques described herein may also be used for any combination of WWAN, WLAN and/or WPAN.

The mobile device 1305 can further include sensor(s) 1340. Such sensors can include, without limitation, one or more accelerometer(s), gyroscope(s), camera(s), magnetometer(s), altimeter(s), microphone(s), proximity sensor(s), light sensor(s), and the like. Additionally or alternatively, the sensor(s) 1340 may include one or more components as described in FIG. 1. For example, the sensor(s) 1340 can include a pixel array 505 and a scanning window array 515, and the scanning window array 515 can be connected to a computer vision feature computation block 560, a look-up table 570, and a logic, memory, and microprocessor block 580, as described elsewhere in this disclosure. Logic, memory, and microprocessor block 580 can be understood to serve as one or more computing devices executing instructions to, for example, cause different windows of pixel values to be stored in the hardware scanning window array 515; or to execute instructions that cause control signals to be provided to peripheral circuitry to control the transfer of pixel values into the hardware scanning window array 515. The microprocessor in block 580 of FIG. 5A can include a microprocessor dedicated to the sensor system shown in FIG. 5A, and this microprocessor may send events to the processing unit(s) 1310 of the mobile device 1305. It is also understood that the sensor(s) 1340 may also include any of the peripheral circuitry 526 illustrated in FIG. 5B. Also, as described with reference to 5B, sensor(s) 1340 can also include cascade classifier hardware. Cascade classifier, which is illustrated with arrows indicating communication with the CV computation hardware and hardware scanning window array, can also serve as one or more computing devices executing instructions to cause different windows of pixel values to be stored in the hardware scanning window array 515; or to execute instructions that cause control signals to be provided to peripheral circuitry to control the transfer of pixel values into the hardware scanning window array 515.

Implementations of the mobile device may also include a Standard Positioning Service (SPS) receiver 1380 capable of receiving signals 1384 from one or more SPS satellites using an SPS antenna 1382. Such positioning can be utilized to complement and/or incorporate the techniques described herein. The SPS receiver 1380 can extract a position of the mobile device, using conventional techniques, from SPS SVs of an SPS system, such as global navigation satellite system (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 1380 can be used various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile device 1305 may further include and/or be in communication with a memory 1360. The memory 1360 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 1360 of the mobile device 1305 also can comprise software elements (not shown), including an operating system, device drivers, executable libraries, and/or other code, such as one or more application programs, which may comprise computer programs provided by various implementations, and/or may be designed to implement methods, and/or configure systems, provided by other implementations, as described herein. In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In implementations provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various implementations may omit, substitute, or add various procedures or components as appropriate. For instance, features described with respect to certain implementations may be combined in various other implementations. Different aspects and elements of the implementations may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several implementations, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Moreover, nothing disclosed herein is intended to be dedicated to the public.

What is claimed is:

1. A low-power vision sensor, comprising:
    an image sensor array capable of capturing an image, the image sensor array having a plurality of rows and a plurality of columns;
    one or more line buffers for transferring image data from one or more rows of the plurality of rows of the image sensor array;
    two-dimensional integration hardware capable of computing a two-dimensional integral image based on the image data transferred by the one or more line buffers, the two-dimensional integral image to be used in a computer vision computation; and
    computer vision feature computation hardware configured to compute a computer vision feature based on two-dimensional blocks within the two-dimensional integral image computed by the two-dimensional integration hardware.

2. The low-power vision sensor of claim 1, further comprising a hardware scanning window array for storing a two-dimensional integral image sample window, the hardware scanning window array having a number of columns fewer than a number of columns of the one or more line buffers.

3. The low-power vision sensor of claim 2, further comprising:
    an image frame buffer for storing the image data prior to access by the two-dimensional integration hardware.

4. The low-power vision sensor of claim 2 further comprising:
    an integral image frame buffer for storing the two-dimensional integral image prior to access by the hardware scanning window array.

5. The low-power vision sensor of claim 1, further comprising an analog-to-digital converter (ADC) coupled to the one or more line buffers and the two-dimensional integration hardware.

6. The low-power vision sensor of claim 1, wherein the computer vision feature is a multi-block local binary pattern (LBP) feature.

7. The low-power vision sensor of claim 2, further comprising a hardware classifier configured to detect the presence of a reference object within the two-dimensional integral image sample window stored in the hardware scanning window array based on computer vision features computed by the computer vision feature computation hardware.

8. The low-power vision sensor of claim 1, wherein no image signal processing circuitry is disposed between the image sensor array and the two-dimensional integration hardware.

9. A method for detecting an object in a low-power vision sensor, comprising:
   capturing, via an image sensor array, an image, the image sensor array having a plurality of rows and a plurality of columns;
   transferring, via one or more line buffers, image data from one or more rows of the plurality of rows of the image sensor array;
   computing, via two-dimensional integration hardware, a two-dimensional integral image based on the image data transferred by the one or more line buffers, the two-dimensional integral image to be used in a computer vision operation; and
   computing, via computer vision feature computation hardware, a computer vision feature based on values computed using two-dimensional blocks within the integral image computed by the two-dimensional integration hardware.

10. The method of claim 9, further comprising storing, via a hardware scanning window array, data based on a two-dimensional integral image sample window generated using the two-dimensional integration hardware, the hardware scanning window array having a number of columns fewer than a number of columns of the one or more line buffers.

11. The method of claim 10, further comprising storing, via an image frame buffer, the image data prior to access by the two-dimensional integration hardware.

12. The method of claim 9, wherein the computer vision feature is a multi-block local binary pattern (LBP) feature.

13. The method of claim 10, further comprising detecting, via a hardware classifier, the presence of a reference object within the two-dimensional integral image sample window stored in the hardware scanning window array based on computer vision features computed by the computer vision feature computation hardware.

14. An apparatus for detecting an object in a low-power vision sensor, comprising:
   hardware means for capturing, via an image sensor array, an image, the image sensor array having a plurality of rows and a plurality of columns;
   hardware means for transferring, via one or more line buffers, image data from one or more rows of the plurality of rows of the image sensor array;
   hardware means for computing, via two-dimensional integration hardware, a two-dimensional integral image based on the image data transferred by the one or more line buffers, the two-dimensional integral image to be used in a computer vision computation; and
   hardware means for computing, via computer vision feature computation hardware, a computer vision feature based on values computed using two-dimensional blocks within the two-dimensional integral image computed by the two-dimensional integration hardware.

15. The apparatus of claim 14, further comprising means for storing, via a hardware scanning window array, a two-dimensional integral image sample window generated using the two-dimensional integration hardware the hardware scanning window.

16. The apparatus of claim 15, further comprising means for storing, via an image frame buffer, the image data prior to access by the two-dimensional integration hardware wherein the frame buffer comprises at least one of an image frame buffer or an integral image frame buffer.

17. The apparatus of claim 14, further comprising means for converting analog data to digital data coupled to the one or more line buffers and the two-dimensional integration hardware.

18. The apparatus of claim 14, wherein the computer vision feature is a multi-block local binary pattern (LBP) feature.

19. The apparatus of claim 15, further comprising hardware means for detecting, comprising a hardware classifier, the presence of a reference object within the two-dimensional integral image sample window stored in the hardware scanning window array based on computer vision features computed by the computer vision feature computation hardware.

20. One or more non-transitory computer-readable media storing computer-executable instructions detecting an object in a low-power vision sensor that, when executed, cause one or more computing devices to:
   capture, via an image sensor array, an image, the image sensor array having a plurality of rows and a plurality of columns;
   transfer, via one or more line buffers, image data from one or more rows of the plurality of rows of the image sensor array;
   compute, via two-dimensional integration hardware, a two-dimensional integral image based on the image data transferred by the one or more line buffers, the two-dimensional integral image to be used in a computer vision computation; and
   compute, via computer vision feature computation hardware, a computer vision feature based on values computed using two-dimensional blocks within the two-dimensional integral image computed by the two-dimensional integration hardware.

21. The non-transitory computer-readable media of claim 20, wherein the computer-executable instructions, when executed, further cause the one or more computing devices to store, via a hardware scanning window array, data based on a two-dimensional integral image sample window generated using the two-dimensional integration hardware, the hardware scanning window array having a number of columns fewer than a number of columns of the one or more line buffers.

22. The non-transitory computer-readable media of claim 21, wherein the computing device further comprises an image frame buffer for storing the image data prior to access by the two-dimensional integration hardware.

23. The non-transitory computer-readable media of claim 21, wherein the computing device further comprises an integral image frame buffer for storing the two-dimensional integral image prior to access by the hardware scanning window array.

24. The non-transitory computer-readable media of claim 20, wherein the computing device further comprises an analog-to-digital converter (ADC) coupled to the one or more line buffers and the two-dimensional integration hardware.

25. The non-transitory computer-readable media of claim 20, wherein the computer vision feature is a multi-block local binary pattern (LBP) feature.

26. The non-transitory computer-readable media of claim 21, wherein the computer-executable instructions, when executed, further cause the one or more computing devices to detect, via a hardware classifier, the presence of a reference object within the two-dimensional integral image sample window stored in the hardware scanning window array based on computer vision features computed by the computer vision feature computation hardware.

27. The method of claim 10, further comprising storing, via an integral image frame buffer, the two-dimensional integral image prior to access by the hardware scanning window array.

28. The apparatus of claim 15, further comprising means for storing, via an integral image frame buffer, the two-dimensional integral image prior to access by the hardware scanning window array.

* * * * *